United States Patent
Farhi et al.

(10) Patent No.: US 11,416,702 B2
(45) Date of Patent: Aug. 16, 2022

(54) BELIEF SPACE PLANNING THROUGH INCREMENTAL EXPECTATION UPDATING

(71) Applicant: Technion Research & Development Foundation Limited, Haifa (IL)

(72) Inventors: Elad Farhi, Haifa (IL); Vadim Indelman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 363 days.

(21) Appl. No.: 16/846,114

(22) Filed: Apr. 10, 2020

(65) Prior Publication Data

US 2020/0327358 A1  Oct. 15, 2020

Related U.S. Application Data

(60) Provisional application No. 62/831,812, filed on Apr. 10, 2019.

(51) Int. Cl.
  *G06F 17/18* (2006.01)
  *G06K 9/62* (2022.01)
  *G06N 7/00* (2006.01)

(52) U.S. Cl.
  CPC .............. *G06K 9/623* (2013.01); *G06F 17/18* (2013.01); *G06K 9/6215* (2013.01); *G06N 7/005* (2013.01)

(58) Field of Classification Search
  None
  See application file for complete search history.

(56) References Cited

U.S. PATENT DOCUMENTS

| | | | |
|---|---|---|---|
| 11,068,935 B1* | 7/2021 | White | G06N 20/20 |
| 11,144,057 B1* | 10/2021 | Ebrahimi Afrouzi | G05D 1/0274 |
| 2020/0065157 A1* | 2/2020 | Nag | G06N 3/02 |

FOREIGN PATENT DOCUMENTS

WO    2019/171378 A1    9/2019

OTHER PUBLICATIONS

Chaves et al., "Efficient Planning with the Bayes Tree for Active SLAM," IEEE/RSJ International Conference on Intelligent Robots and Systems (IROS), Daejeon Convention Center, Oct. 9-14, 2016; pp. 4664-4671 (8 pages).

(Continued)

*Primary Examiner* — Anh Nguyen
(74) *Attorney, Agent, or Firm* — Knobbe, Martens, Olson & Bear, LLP

(57) ABSTRACT

A system and methods are provided for decision making under uncertainty, for selecting an optimal action from among multiple candidate actions in belief space planning (BSP), including, for a new propagated belief: selecting from stored propagated beliefs a closest propagated belief; selecting, from among the stored measurement samples associated with the closest propagated belief, re-use measurement samples that provide a representative set of a measurement likelihood distribution corresponding to the new propagated belief; determining an information gap between a stored posterior belief associated with a re-use measurement sample and a new posterior belief that would be inferred by applying the re-use measurement sample to the new propagated belief; updating the stored posterior belief to account for the information gap; and calculating objective values for the multiple candidate actions, the objective values being weighted summations including immediate scores of the updated posterior beliefs.

19 Claims, 10 Drawing Sheets
(1 of 10 Drawing Sheet(s) Filed in Color)

(56) References Cited

OTHER PUBLICATIONS

Endres et al., "A New Metric for Probability Distributions," IEEE Transactions on Information Theory, vol. 49, No. 7, Jul. 2003; pp. 1858-1860 (3 pages).
Farhi et al., "Towards Efficient Inference Update through Planning via JIP—Joint Inference and Belief Space Planning," IEEE International Conference; 2017 (8 pages).
Indelman et al., "Planning in the Continuous Domain: a Generalized Belief Space Approach for Autonomous Navigation in Unknown Environments," The International Journal of Robotics Research; Jun. 2015 (57 pages).
Kopitkov et al., "No Belief Propagation Required: Belief Space Planning in High—Dimensional State Spaces Via Factor Graphs, the matrix Determinant Lemma, and Re-use of Calculation," The International Journal of Robotics Research; Aug. 2017 (51 pages).
Topsoe et al., "Some Inequalities for Information Divergence and Related Measures of Discrimination," University of Copenhagen; 2000; pp. 1-8 (8 pages).

* cited by examiner

BELIEF SPACE PLANNING THROUGH INCREMENTAL EXPECTATION UPDATING

CROSS-REFERENCE TO RELATED APPLICATIONS

This application claims the benefit of U.S. Provisional Patent Application No. 62/831,812, filed Apr. 10, 2019, the contents of which are incorporated herein by reference.

FIELD OF THE INVENTION

The present invention relates to the field of artificial intelligence.

BACKGROUND OF THE INVENTION

Computationally efficient approaches for decision making under uncertainty are useful for a range of artificial intelligence applications, including guidance of autonomous systems. Decision making typically includes determination of optimal actions over time. A common paradigm for such decision making is Belief Space Planning (BSP), one form of which is known as the partially observable Markov decision process (POMDP) problem, in which different candidate actions are considered together with predicted future measurements to determine an optimal action. The (POMDP) problem is known to be computationally intractable for all but the smallest problems, i.e. no more than few dozen states.

The main cause for the BSP problem intractability lies in the calculation of expectation in the objective function:

$$J(\mathcal{U}) = \mathbb{E}_z \left[ \sum_i c_i(b_i, u_{i-1}) \right]. \tag{1}$$

The objective over a candidate action sequence $\mathcal{U}$, is obtained by calculating the expected value of all possible rewards (or costs) r received from following $\mathcal{U}$. Since the reward (or cost) function is a function of the belief b and the action led to it u, in practice the objective considers all future beliefs obtained from following $\mathcal{U}$, i.e. the expectation considers the joint measurement likelihood of all future measurements z. This general problem is referred to as the full solution of BSP, denoted by X-BSP, expectation-based BSP.

Performing inference over multiple future beliefs is one of the main reasons for the costly computation time of X-BSP. In a planning session with horizon of 3 steps ahead, 3 candidate actions per step and 3 samples per action, there are 819 beliefs to be solved. Cutting down on the computation time of each belief would benefit the overall computation time of the planning process.

As in any computational problem, one can either streamline the solution process or change the problem, i.e. take simplifying assumptions or approximations. Over the years, numerous approaches have been developed to trade-off sub-optimal performance with reduced computational complexity of POMDP. While the majority of these approaches, assume that some sources of absolute information (GPS, known landmarks) are available or considered the environment to be known, recent approaches have relaxed these assumptions, accounting for the uncertainties in the mapped environment thus far as part of the decision making process. An example of such an approach is described in V. Indelman, et al., "Planning in the continuous domain: a generalized belief space approach for autonomous navigation in unknown environments," in Intl. J. of Robotics Research, 34 (7):849-882, 2015, incorporated herein by reference.

Other than assuming available sources of absolute information, some of these approaches use discretization in order to reduce computational complexity. Sampling based approaches, discretize the state space using randomized exploration strategies to locate the belief's optimal strategy. Other approaches, discretize the action space, thus trading optimality for reduced computational load. While many sampling based approaches—such as, probabilistic road maps (PRMs), rapidly exploring random trees, and rapidly exploring random graphs (RRGs)—assume perfect knowledge of the state, along with deterministic control and a known environment, efforts have been made to remove these simplifying assumptions. These efforts vary in the alleviated-assumptions, from the belief road map (BRM) and rapidly exploring random belief trees (RRBTs), to partially observable Monte-Carlo planning (POMCP), determinized sparse partially observable trees (DESPOTs) and full simultaneous localization and mapping (SLAM) in discrete and continuous domains, accounting for uncertainties in the environment mapped thus far as part of the decision making process.

In contrast to the large amount of work on approximating the X-BSP problem, only a few approaches include re-use of prior calculations. Although under simplifying assumptions, including ML, these approaches have described re-using computationally expensive calculations during planning. These include: Kopitkov and Indelman, "No belief propagation required: Belief space planning in high-dimensional state spaces via factor graphs, matrix determinant lemma and re-use of calculation," Intl. J. of Robotics Research, 36 (10):1088-1130, August 2017; and Chaves and Eustice, "Efficient planning with the Bayes tree for active SLAM," in Intelligent Robots and Systems (IROS), 2016 IEEE/RSJ International Conference, pp. 4664-4671. IEEE, 2016, both of which are incorporated herein by reference. Chaves and Eustice consider a Gaussian belief under ML-BSP in a Bayes tree representation. All candidate action sequences consider a shared location (entrance pose), thus enabling the re-use of calculations with state ordering constraints. Kopitkov and Indelman also consider a Gaussian belief under ML-BSP, utilizing a factor graph representation of the belief while considering an information theoretic cost. Like Chaves and Eustice, they consider calculation re-use within the same planning session.

A further example of re-use, based on the simplifying assumption that all samples taken from a single distribution, can be re-used is described by the inventors of the present invention in the following references, which are incorporated herein by reference: Farhi and Indelman, in "Towards efficient inference update through planning via jip—joint inference and belief space planning," IEEE Intl. Conf. on Robotics and Automation (ICRA), 2017; and PCT application WO2019/171378, entitled, "Efficient Inference Update using Belief Space Planning."

Re-use of prior belief calculations, without the simplifying assumptions described above, could have broader application to many systems employing artificial intelligence, such as autonomous systems.

SUMMARY OF THE INVENTION

Embodiments of the present invention provide methods for Incremental expectation BSP, or iX-BSP, which incrementally updates the expectation-related calculations in X-BSP, by re-using measurements sampled in a prior planning session, while selectively re-sampling measurements in order to assure an adequate representation of the measurement likelihood. Instead of re-calculating the planning session each time from scratch, the method described below includes incrementally updating a previous session with newly received information. In addition, the approximation ML-BSP to formulate incremental ML-BSP, referred to herein as iML-BSP, is expanded by enforcing the ML assumption over iX-BSP, as being done over X-BSP. Given access to calculations from pre-cursory planning, at each look ahead step i in the current planning session, iML-BSP considers the appropriate sample from the $i_{th}$ look ahead step in the precursory planning session for re-use. If the sample constitutes an adequate representation of the measurement likelihood that would have been considered at the $i_{th}$ look ahead step in current planning session, then iML-BSP utilizes the associated previously solved belief from the precursory planning session. If the mentioned sampled is considered as an inadequate representation of the measurement likelihood, iX-BSP may follow the process of ML-BSP, whereby the most likely measurement of the nominal measurement likelihood is considered instead.

The approach described herein includes: calculating incrementally the expectation over future observations by a set of samples comprised of newly sampled measurements and re-used sampled measurements that were generated at prior planning sessions; and selectively resampling based on a method of Multiple Importance sampling, while considering a balance heuristic.

There is therefore provided, by embodiments of the present invention, a system and methods for decision making under uncertainty, including selecting an optimal action from among multiple candidate actions, including the implementation of steps that include: inferring, from a current belief, multiple new propagated beliefs according to respective multiple candidate actions; accessing a stored set of propagated beliefs, each given stored propagated belief being associated with one or more stored measurement samples and with one or more respective stored posterior beliefs inferred from the given stored propagated belief, according to a respective measurement sample, wherein the stored propagated beliefs were propagated from prior beliefs during one or more precursory planning sessions at one or more respective previous times.

The steps further include, for each new propagated belief generated for a respective candidate action: selecting from the set of stored propagated beliefs a closest stored propagated belief; and selecting, from among the one or more stored measurement samples associated with the closest stored propagated belief, re-use measurement samples for a representative set of a measurement likelihood distribution corresponding to the new propagated belief.

The steps further include, for each re-use measurement sample: determining an information gap between the stored posterior belief associated with the re-use measurement sample and a new posterior belief that would be inferred by applying the re-use measurement sample to the new propagated belief; responsively updating the stored posterior belief to account for the information gap and associating the new propagated belief with the updated posterior belief; and calculating an immediate score for the updated posterior belief associated with the new propagated belief.

The steps further include, subsequently, calculating objective values for the multiple candidate actions, wherein the calculation of the objective values is a weighted summation including the immediate scores of the updated posterior beliefs; and subsequently, determining the optimal action from among the multiple candidate actions according to the candidate action with the optimal objective value.

In some embodiments, the steps may also include: newly sampling one or more additional measurement samples for one or more of the new propagated beliefs, inferring from the one or more additional measurement samples respective one or more additional posterior beliefs, and calculating additional immediate scores for the one or more additional posterior beliefs. The calculation of the objective values is typically a summation including the immediate scores of the updated posterior beliefs and of the additional posterior beliefs. Selecting re-use measurement samples for the representative set may include determining that the re-use measurement samples are an inadequate representative measurement set and that adding the additional measurement samples provides an adequate representative measurement set.

In further embodiments, selecting the re-use measurement samples for the representative set may include determining which measurement samples are within a pre-determined variance range of the measurement likelihood distribution.

In further embodiments, the steps may also include determining that the information gap is less than a wildfire threshold and updating the stored posterior belief to account for the information gap may include making no updating calculations of the stored posterior belief.

The candidate actions may be sequences of actions over a planning horizon, by which respective sequences of propagated beliefs branch out from the new propagated belief, and the stored propagated beliefs may include planning horizons including stored branches of stored propagated beliefs and associated measurements. The steps may further include, upon determining that the information gap is less than a wildfire threshold, associating a stored branch of the closed stored propagated belief with the new propagated belief, with no updating of stored posterior beliefs of the stored branch.

In further embodiments, the stored propagated beliefs include planning horizons including stored branches of stored propagated beliefs and associated measurements, wherein a stored branch of the closest propagated belief has a planning horizon of $L_1$, wherein a time of the closest propagated belief is k, such that the last posterior beliefs of the stored branch are associated with a time $k+L_1$, wherein the multiple candidate actions have a planning horizon of $L_2$, wherein a time of the new propagated belief is k+l, and wherein the steps of the system further comprise: sampling new measurements between times $k+L_1$ and $k+L_2+l$; responsively inferring additional posterior beliefs; calculating for the additional posterior beliefs respective additional immediate scores, and calculating the objective values by a weighted summation incorporating the additional immediate scores.

In some embodiments, the immediate score may reflect a cost that is a function of the posterior belief and the candidate action, and wherein the optimal objective value is a minimum objective value of the candidate actions. Alternatively, the immediate score may reflect a reward that is a function of the posterior belief and the candidate action, and wherein the optimal objective value is a maximum objective value of the candidate actions.

In further embodiments, the one or more measurement samples associated with each propagated belief space may be one sampled measurement that is selected as the maximum likelihood measurement. Determining the information gap may include performing data association (DA) matching to determine measurements with DA to update, to add or to remove. Updating the stored posterior belief may include performing corresponding DA modifications to generate updated or added measurements and responsively to update one or more corresponding measurement values.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF THE DRAWINGS

The patent or application file contains at least one drawing/photograph executed in color. Copies of this patent or patent application with color drawing(s)/photograph(s) will be provided by the Office upon request and payment of the necessary fee.

For a more complete understanding of the invention, reference is made to the following description and accompanying drawings.

Figure 1:
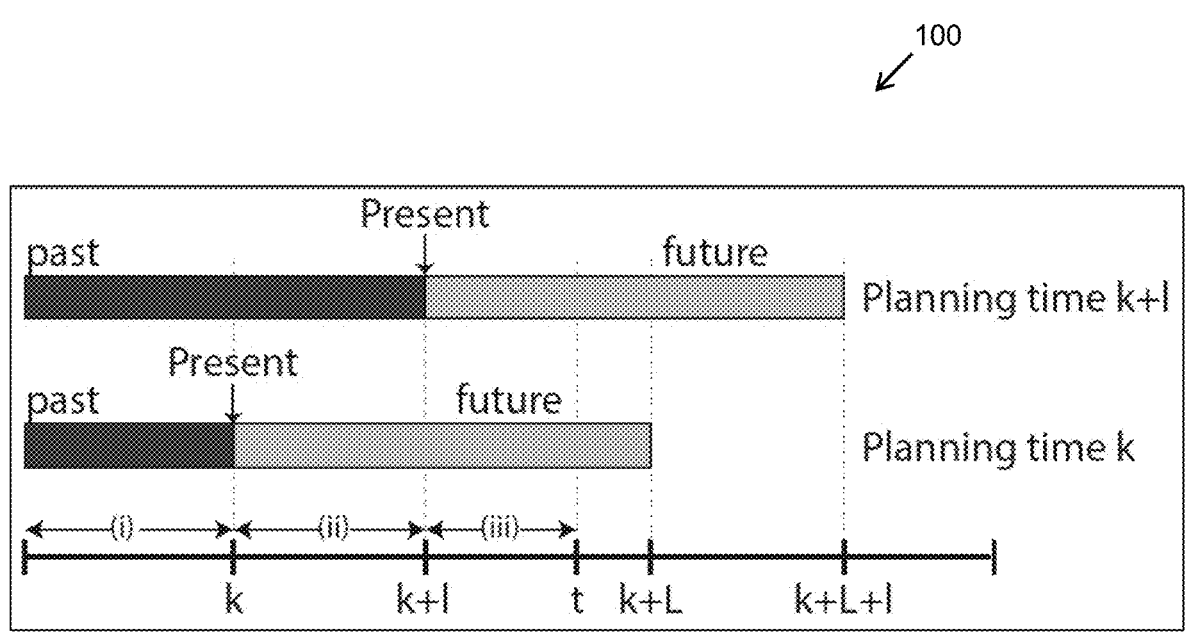
FIG. 1 illustrates a planning horizon overlap between two planning sessions, one at a planning time at which a prior belief was calculated and the second being a current planning session, according to embodiments of the present invention.

DETAILED DESCRIPTION OF THE PREFERRED EMBODIMENTS 1.0 Problem Formulation 1.1 Belief Definition Hereinbelow, aspects of a BSP formulation and the common Maximum Likelihood (ML) approximation are defined. Let $x_t$ denote the agent's state at time instant t and $\mathcal{L}$ represent the mapped environment thus far. The joint state, up to and including time k, is defined as $X_k \doteq \{x_0, \ldots, x_k, \mathcal{L}\}$. We shall be using the notation $t|k$ to refer to some time instant t while considering information up to and including time k. This time notation because hereinbelow both current and future time indices are used in the same equations. Let $z_{t|k}$ and $u_{t|k}$ denote, respectively, measurements and the control action at time t, while the current time is k. The measurements and controls up to time t given current time is k, are represented by $$z_{1:t|k} \doteq \{z_{1|k}, \ldots, z_{t|k}\}, u_{0:t-1|k} \doteq \{u_{0|k}, \ldots, u_{t-1|k}\}, \quad (2)$$

The posterior probability density function (pdf) over the joint state, denoted as the belief, is given by $$b[x_{t|k}] \doteq \mathbb{P}(X_t | z_{1:t|k}, u_{0:t-1|k}) = \mathbb{P}(X_t | H_{t|k}). \quad (3)$$

where $H_{t|k} \doteq \{u_{0:t-1|k}, z_{1:t|k}\}$ represents history at time t given current time k. The propagated belief at time t, i.e. belief $b[X_{t|k}]$ lacking the measurements of time t, is denoted by $$b^-[X_{t|k}] \doteq b[X_{t-1|k}] \cdot \mathbb{P}(x_t | x_{t-1}, u_{t-1|k}) = \mathbb{P}(X_t | H_{t|k}^-), \quad (4)$$

where $H_{t|k}^- \doteq H_{t-1|k} \cup \{u_{t-1|k}\}$. Using Bayes rule, Eq. (3) can be rewritten as $$b[X_{t|k}] \propto \mathbb{P}(X_0) \prod_{i=1}^{t} \left[ \mathbb{P}(x_i | x_{i-1}, u_{i-1|k}) \prod_{j \in \mathcal{M}_{i|k}} \mathbb{P}(z_{i,j|k} | x_i, l_j) \right], \quad (5)$$

where $\mathbb{P}(X_0)$ is the prior on the initial joint state, and $\mathbb{P}(x_i | x_{i-1}, u_{i-1|k})$ and $\mathbb{P}(z_{i,j|k} | x_i, l_j)$ denote, respectively, the motion and measurement likelihood models. Here, $z_{i,j|k}$ represents an observation of landmark $l_j$ from robot pose $x_i$, while the set $\mathcal{M}_{i|k}$ contains all landmark indices observed at time i, i.e. it denotes data association (DA). The DA of a few time steps is denoted by $\mathcal{M}_{1:i|k} \doteq \{\mathcal{M}_{1|k}, \ldots, \mathcal{M}_{i|k}\}$.

1.2 Belief Space Planning

The purpose of BSP is to determine an optimal action given an objective function J, belief $b[X_{k|k}]$ at planning time instant k and, considering a discrete action space, a set of candidate actions $\mathcal{U}_k$. While these actions can be with different planning horizons, we consider for simplicity the same horizon of L look ahead steps for all actions, i.e. $\mathcal{U}_k = \{u_{k:k+L-1}\}$. The optimal action is given by $$u_{k:k+L-1|k}^\star = \underset{u_{k:k+L-1|k} \in \mathcal{U}_k}{\mathrm{argmax}} \; J(u_{k:k+L-1|k}),$$

where the general objective function J(•) is defined as $$J(u) \doteq \underset{z_{k+1:k+L|k}}{\mathbb{E}} \left[ \sum_{i=k+1}^{k+L} r_i(b[X_{i|k}], u_{i-1|k}) \right], \quad (6)$$

with $u \doteq u_{k:k+L-1|k}$, an immediate score (a reward or cost) $r_i$ and where the expectation is with respect to future observations $z_{k+1:k+L|k}$ while, $$z_{k+1:k+L|k} \sim \mathbb{P}(z_{k+1:k+L|k} | H_{k|k}, u_{k:k+L-1}). \quad (7)$$

The expectation in (6) can be written explicitly $$J(u) = \int_{z_{k+1|k}} \mathbb{P}(z_{k+1|k} | H_{k|k}, u_{k|k}) \cdot r_{k+1}(.) + \ldots + \quad (8)$$

$$\int_{z_{k+1:i|k}} \mathbb{P}(z_{k+1:i|k} | H_{k|k}, u_{k:i-1|k}) \cdot r_i(.) + \ldots$$

Using the chain rule and the Markov assumption, we can re-formulate the joint measurement likelihood (7), as $$\mathbb{P}(z_{k+1:k+L|k} | H_{k|k}, u_{k:k+L-1}) = \prod_{i=k+1}^{k+L} \mathbb{P}(z_{i|k} | H_{i|k}^-) \quad (9)$$

were $H_{i|k}^-$ is a function of a specific sequence of measurement realization, i.e.

$$H_{i|k}^- = H_{k|k} \cup \{z_{k+1:i-1|k}, u_{k:i-1|k}\}. \quad (10)$$

Using (9), we can re-formulate (8) as $$J(u) = \int_{z_{k+1|k}} \mathbb{P}(z_{k+1|k} | H_{k+1|k}^-) \Big[ r_{k+1}(b[X_{k+1|k}], u_{k|k}) + \ldots \int_{z_{i|k}} \mathbb{P}(z_{i|k} | H_{i|k}^-) \; [r_i(b[X_{i|k}], u_{i-1|k}) + \ldots \;] \Big], \quad (11)$$

where each integral accounts for all possible measurement realizations from an appropriate look ahead step, with $i \in (k+1, k+L]$ and $b[X_{i|k}] \doteq \mathbb{P}(X_{i|k}|H_{i|k}^-, z_{i|k})$.

Evaluating the objective for each candidate action in $\mathcal{U}_k$ involves calculating (11), considering all different measurement realizations. As solving these integrals analytically is typically not feasible, in practice these are approximated by sampling future measurements. Although the measurement likelihood $\mathbb{P}(z_{i|k}|H_{i|k}^-)$ is unattainable, one can still sample from it. Specifically, consider the i-th future step and the corresponding $H_{i|k}^-$ to some realization of measurements from the previous steps. In order to sample from $\mathbb{P}(z_{i|k}|H_{i|k}^-)$, we should marginalize over the future robot pose $x_i$ and landmarks $\mathcal{L}$ $$\mathbb{P}(z_{i|k} | H_{i|k}^-) = \int_{x_i} \int_{\mathcal{L}} \mathbb{P}(z_{i|k} | x_i, \mathcal{L}) \cdot \mathbb{P}(x_i, \mathcal{L} | H_{i|k}^-) dx_i d\mathcal{L}, \quad (12)$$

where $\mathbb{P}(x_i, \mathcal{L}|H_{i|k}^-)$ can be calculated from the belief $b^-[X_{i|k}] \doteq \mathbb{P}(X_{i|k}|H_{i|k}^-)$. We approximate the above integral via sampling as summarized in Alg. 1. One can also choose to approximate further by considering only landmark estimates $\hat{\mathcal{L}}$ (i.e. without sampling $\mathcal{L}$).

Each sample $\chi_i$ and the determined DA (lines 1-2 of Algorithm 1) define a measurement likelihood $\mathbb{P}(z_{i|k}|\chi_i, \mathcal{M}_{i|k}(\chi_i)) = \Pi_{j \in \mathcal{M}_{i|k}(\chi_i)} \mathbb{P}(z_{i,j|k}|x_i, l_j)$ from which observations are sampled in line 3. Considering $n_x$ samples, $\{\chi_i^n\}_{n=1}^{n_x}$, we can approximate Eq. (12) by $$\mathbb{P}(z_{i|k} | H_{i|k}^-) \approx \eta_i \sum_{n=1}^{n_x} w_i^n \cdot \mathbb{P}(z_{i|k} | \chi_i^n, \mathcal{M}_{i|k}(\chi_i^n)), \quad (13)$$

where $w_i^n$ represents n-th sample weight, $\chi_i^n$, and $\eta_i^{-1} \doteq \Sigma_{n=1}^{n_z} w_i^n$. Here, since all samples are generated from their original distribution (corresponding to the proposal distribution in importance sampling), see line 1, we have identical weights.

For each sample $\chi_i^n \in \{\chi_i^n\}_{n=1}^{n_x}$, we may consider $n_z$ measurement samples (line 3), providing the set $\{z_{i|k}^{n,m}\}_{m=1}^{n_z}$. In other words, Alg. 1 yields $n_x \cdot n_z$ sampled measurements, denoted by $\{z_{i|k}\}$, for a given realization of $z_{k+1:i-1|k}$. Thus, considering all such possible realizations, we get $(n_x \cdot n_z)^{i-k}$ sampled measurements for the look ahead step at time i, i.e. the (i–k)-th look ahead step.

We can now write an unbiased estimator for (11), considering the $(n_x \cdot n_z)^{i-k}$ sampled measurements. In particular, for the look ahead step at time i, we get $$\mathbb{E}_{z_{k+1:i|k}} [r_i(b[X_{i|k}], u_{i-1|k})] \approx \quad (14)$$

$$\eta_{k+1} \sum_{\{z_{k+1|k}\}} w_{k+1}^n \Bigg( \ldots \Bigg( \eta_i \sum_{\{z_{i|k}\}} w_i^n \cdot r_i(b[X_{i|k}], u_{i-1|k}) \Bigg) \ldots \Bigg)$$

where $H_{i|k}^-$ varies with each measurement realization.

The above exponential complexity makes the described calculations quickly infeasible is referred to herein as X-BSP. A commonly used approximation for the X-BSP problem is the the Maximum Likelihood approximation.

1.3 Belief Space Planning Under ML

A very common approximation to Eq. (6) is based on the maximum likelihood (ML) observations assumption. This approximation, referred to as ML-BSP, is often used in BSP and in particular in the context of active SLAM: Instead of accounting for different measurement realizations, only the most likely observation is considered at each look ahead step, which corresponds to $n_x = n_z = 1$ where the single sample is the most likely one. So under ML, the expectation from Eq. (6) is omitted, and the new objective formulation is given by $$J^{ML}(u) \doteq \sum_{i=k+1}^{k+L} r_i(b[X_{i|k}], u_{i-1|k}), \quad (15)$$

thus drastically reducing complexity at the expense of sacrificing performance. While the future belief $b[X_{i|k}]$ is given by $\mathbb{P}(X_{0:i}|H_{k|k}, u_{k:i-1}, z_{k+1:i|k}^{ML})$, and for the Gaussian case $z_{k+1:i|k}^{ML}$ are the measurement model mean-values.

2.0 Problem Statement

We assume that the planning session at time instant k has been solved by evaluating the objective (6) via appropriate measurement sampling for each action in $\mathcal{U}_k$ and subsequently choosing the optimal action $u^*_{k:k+L-1|k}$. A subset of this action, $u^*_{k:k+l-1|k} \in u^*_{k:k+L-1|k}$ with $l \in [1, L)$, is now executed, new measurements $z_{k+1:k+l|k+l}$ are obtained and the posterior belief $b[X_{k+l|k+l}]$ in inference is calculated, upon which a new planning session is initiated.

Determining the optimal action sequence at time instant k+l involves evaluating the objective function for each candidate action $u' = u_{k+l:k+l+L-1|k+l} \in \mathcal{U}_{k+l}$ $$J(u') \doteq \mathbb{E}\Bigg[\sum_{i=k+l+1}^{k+l+L} r_i(b[X_{i|k+l}], u'_{i-1|k+l})\Bigg], \quad (16)$$

where the expectation is with respect to future observations $z_{k+l+1:k+l+L|k+l}$. Existing approaches perform these costly evaluations from scratch for each candidate action. Embodiments of the present invention described below exploit the fact that expectation calculations from X-BSP planning sessions at two time times, k and k+1 may be similar and therefore be be "re-used." Hereinbelow, we demonstrate an approach for evaluating the objective function (16) more efficiently by selectively re-using calculations from preceding planning sessions.

The following environmental conditions are assumed for the approach described herein:
Assumption 1 Calculations from a precursory planning session are accessible from the current planning session.
Assumption 2 The planning horizon of current time k+1, overlaps the planning horizon of the precursory planning time k, i.e. l∈[1, L).
Assumption 3 Action sets $\mathcal{U}_{k+l}$ and $\mathcal{U}_k$ overlap in the sense that actions in $\mathcal{U}_k$ that overlap in the executed portion of the optimal action also partially reside in $\mathcal{U}_{k+l}$. In other words, $\forall u \in \mathcal{U}_k$ with $u = \{u_{k:k+l-1|k}, u_{k+l:k+L-1|k}\}$ and $u_{k:k+l|k} \equiv u^*_{k:k+l-1|k}$, $\exists u' \in \mathcal{U}_{k+l}$ such that $u' = \{u'_{k+l:k+L-1}, u'_{k+L:k+l+L-1}\}$ and $u'_{k+l:k+L-1} \cap u_{k+l:k+L-1|k} \neq \emptyset$.

3.0 Approach

The embodiments of the present invention described herein provide an incremental BSP (ix-BSP) approach, by which an objective function is calculated incrementally by re-using calculations from past experience (e.g., precursory planning sessions), thereby saving computation time while preserving the benefits of the expectation solution provided by X-BSP.

iX-BSP re-uses previous calculations by enforcing specific measurements as opposed to sampling them from the appropriate measurement likelihood distribution. The measurements being enforced were considered and sampled in some precursory planning session, in which each of the measurements had a corresponding posterior belief. By enforcing some previously considered measurements, we can make use of the previously calculated posterior beliefs, instead of performing inference from scratch. To make use of the data acquired since these re-used beliefs were calculated, when needed, we incrementally update them to match the information up to the current time.

Hereinbelow, in Section 3.1, the similarities between the calculations required for two successive planning sessions are compared, indicating the basis for re-use of prior calculations for iX-BSP. In Section 3.2 we provide an overview of the entire iX-BSP paradigm, and continue with covering each of the building blocks of iX-BSP. These include: selecting the closest branch and deciding whether there is sufficient data for calculations re-use (Section 3.3), validating samples for re-use, incorporating forced samples and belief update (Section 3.4), and calculating expectation incrementally with forced samples (Section 3.5). In addition, to demonstrate how iX-BSP can be utilized to improve approximations of the original X-BSP problem, the particular case of iML-BSP is shown (Section 3.6), demonstrating iX-BSP under a maximum likelihood (ML) assumption.

3.1 Comparing Planning Sessions

Here we examine the similarities between two planning sessions that comply with Assumptions 1-3. For two planning sessions, both with horizon of L steps ahead, the first occurred at time k and the second at time k+1. Under Assumption 2 the two planning horizons overlap, i.e. l<L, and under Assumption 3 both planning sessions share some actions. For this comparison let us consider the action chosen at planning time k which also partially resides in a candidate action from planning time k+1, and denote both as $\overset{\star}{u}_{k:k+L} = \{\overset{\star}{u}_k, \ldots, \overset{\star}{u}_{k+L}\}$.

FIG. 1 illustrates a graph 100 showing a horizon overlap between planning times, one at a look ahead step of time t, given planning time k, i.e. $b[X_{t|k}]$, and the other at planning time k+1, i.e. $b[X_{t|k+l}]$. The shared sections, separated by time instances, are denoted as (i), (ii), and (iii).

At future time t∈[k+l+1, k+L], the belief created by the action sequence $\overset{\star}{u}_{k:t-1}$ is given by $$b[X_{t|k}] \propto \underbrace{b[X_{k|k}]}_{(a)} \cdot \underbrace{\prod_{s=k+1}^{k+l} \left[ \mathbb{P}(x_s | x_{s-1}, \overset{\star}{u}_{s-1}) \prod_{g \in M_{s|k}} \mathbb{P}(z^g_{s|k} | x_s, l_g) \right]}_{(b)} \cdot \underbrace{\prod_{i=k+l+1}^{t} \left[ \mathbb{P}(x_i | x_{i-1}, \overset{\star}{u}_{i-1}) \prod_{j \in M_{i|k}} \mathbb{P}(z^j_{i|k} | x_i, l_j) \right]}_{(c)}, \quad (17)$$

where $(17)_{(a)}$ is the inference posterior at time k corresponding to the lower-bar area (i) in FIG. 1, $(17)_{(b)}$ are the motion and observation factors of future times k+1:k+l corresponding to the lower-bar area (ii) in FIG. 1 and $(17)_{(c)}$ are the motion and observation factors of future times k+l+1:t corresponding to the lower-bar area (iii) in FIG. 1. For the same future time t and the same candidate action, the belief for planning time k+1 is given by, $$b[X_{t|k+l}] \propto \underbrace{b[X_{k|k+l}]}_{(a)} \cdot \underbrace{\prod_{s=k+1}^{k+l} \left[ \mathbb{P}(x_s | x_{s-1}, \overset{\star}{u}_{s-1}) \prod_{g \in M_{s|k+l}} \mathbb{P}(z^g_{s|k+l} | x_s, l_g) \right]}_{(b)} \cdot \underbrace{\prod_{i=k+l+1}^{t} \left[ \mathbb{P}(x_i | x_{i-1}, \overset{\star}{u}_{i-1}) \prod_{j \in M_{i|k+l}} \mathbb{P}(z^j_{i|k+l} | x_i, l_j) \right]}_{(c)}, \quad (18)$$

where $(18)_{(a)}$ is the inference posterior at time k corresponding to the upper-bar area (i) in FIG. 1, $(18)_{(b)}$ are the motion and observation factors of past times k+1:k+l corresponding to the upper-bar area (ii) in FIG. 1 and $(18)_{(c)}$ are the motion and observation factors of future times k+l+1:t corresponding to the upper-bar area (iii) in FIG. 1.

Although seemingly conditioned on a different history, $(17)_{(a)}$ and $(18)_{(a)}$ are identical and denote the same posterior obtained at time k (see FIG. 1 area (i)), leaving the difference between (17) and (18) restricted to $(\bullet)_{(b)}$ and $(\bullet)_{(c)}$. While $(17)_{(b)}$ represents future actions and future measurements predicted at time k, $(18)_{(b)}$ represents executed actions and previously acquired measurements, this can can be seen more clearly using area (ii) in FIG. 1. At planning time k (i.e. lower bar), area (ii) denotes future prediction for the time interval k:k+l, while at planning time k+l (i.e. upper bar), the same time interval denotes past measurements, and so $(17)_{(b)}$ and $(18)_{(b)}$ are potentially different, depending on how accurate was the prediction at planning time k. The differences between the predictions made during planning and the actual measurements obtained in present time are twofold, the difference in measurement values and the difference in data association, as described further hereinbelow.

Even-though both $(17)_{(c)}$ and $(18)_{(c)}$ refer to future actions and measurements (see area (iii) in FIG. 1) they do so with possibly different values and data association since they were sampled from possibly different probability densities. Solving the objective (11), requires sampling from (12) (e.g. using Alg. 1), the samples from planning time k were sampled from $\mathbb{P}(z_{t|k}|H_{t|k}^-)$, while the samples from planning time k+l were sampled from $\mathbb{P}(z_{t|k+l}|H_{t|k+l}^-)$. These probabilities would be identical only if conditioned on the same history, i.e. only if the predictions made for time interval k:k+l at planning time k were accurate both in data association and measurement values.

As such, in order to mind the gap between (17) and (18), and obtain identical expressions one must update $(17)_{(b)}$ to match $(18)_{(b)}$, and second, to adjust the samples from $(17)_{(c)}$ to properly represent the updated measurement probability density.

3.2 Approach Overview

This section presents an overview of iX-BSP at planning time k+l, while the relevant precursory planning session occurred at planning time k, as summarized in Appendix C, Algorithm 2: "iX-BSP at Planning Time k+l".

After executing l steps out of the optimal (or suboptimal) action sequence suggested by planning at time k and performing inference over the newly received measurements, we obtain $b[X_{k+l|k+l}]$. Performing planning at time k+l under iX-BSP, requires first locating the "closest belief" to $b[X_{k+l|k+l}]$ from the precursory planning session (Alg. 2 line Alg. 1). The "closest belief" to $b[X_{k+l|k+l}]$, denoted as $\tilde{b}[X_{k+l|k}]$, is the one with the minimal distance to it, while considering some appropriate probability density function metric.

Hereinbelow, the following definitions of terms are used:

| Variable | Description |
| --- | --- |
| $\square_{t|k}$ | Of time t while current time is k |
| $b[X_{t|k}]$ | belief at time t while current time is k |
| $b^-[X_{t|k}]$ | belief at time t − 1 propagated only with action $u_{t-1|k}$ |
| $\tilde{b}[X_{t|k}]$ | The root of the selected branch for re-use from planning time k |
| $E_{t|k}$ | The set of all beliefs from planning time k rooted in $\tilde{b}[X_{t|k}]$ |
| $b^s[X_{t|k+l}]$ | The $s_{th}$ sampled belief representing $b[X_{t|k+l}]$ |
| $b_\alpha^{s-}[X_{t+1|k+l}]$ | The sampled belief $b^s[X_{t|k+l}]$ propagated with the α candidate action |
| $\{b_\alpha^r[X_{t|k+l}]\}_{r=1}^n$ | A set of n sampled beliefs that are first order children of $b_\alpha^{s-}[X_{t|k+l}]$ and are representing $b[X_{t|k+l}]$ |
| $b_\alpha^{s'-}[X_{t+i|k}]$ | A propagated belief from $E_{t|k}$ closest to $b_\alpha^{s-}[X_{t+i|k+l}]$ |
| dist | The distance between $b_\alpha^{s'-}[X_{t|k}]$ and $b_\alpha^{s-}[X_{t|k+l}]$ |
| Dist | The distance between $\tilde{b}[X_{t|k}]$ and the corresponding posterior $b[X_{t|k}]$ |
| $\{b^r[X_{t|k}]\}_{r=1}^n$ | A set of n sampled beliefs representing $b[X_{t|k}]$ |
| $n_u$ | number of candidate actions per step |
| $(n_x \cdot n_z)$ | number of samples for each candidate action |
| data | All available calculations from precursory planning session |
| $u_{k:k+L|k}^*$ | The (sub)optimal action sequence of length L chosen in planning at time k |
| $\epsilon_c$ | belief distance critical threshold, above it re-use has no computational advantage |
| $\epsilon_{wf}$ | wildfire threshold, less that which is considered close enough for re-use without update |
| useWF | a binary flag, determining whether or not the wildfire condition is considered |
| $D_{PQ}(p, q)$ | The distance between distributions p and q, according to the $D_{PQ}$ metric |
| $D_{DA}(p, q)$ | The divergence between distributions p and q, according to the data association difference |
| $\mathcal{M}_{t|k}$ | Data association (DA) at time t while current time is k |

If the distance of the closest belief (denoted by Dist) is larger than some critical value $\epsilon_c$, i.e. the closest prediction from precursory planning session is too far off, iX-BSP would have no advantage over the standard X-BSP, so the latter is executed (Alg. 2 line 12).

On the other hand, if Dist meets the wildfire condition, i.e. it is smaller than the critical value $\epsilon_{wf}$, we consider the difference between the beliefs as insignificant and continue with re-using the precursory planning session without any additional update (Alg. 2 line 4).

When precursory planning is "close-enough" (i.e., less than a predefined threshold, as described below), we can re-use it to save computation time. Under iX-BSP, the closest belief from planning at time k (denoted as $\tilde{b}[X_{k+l|k}]$) to the posterior received at current time $b[X_{k+l|k+l}]$ is then compared to the posterior. If the difference between the closest belief and the posterior is unacceptable, X-BSP is performed. The full process of selecting the closest belief and updating the posterior is described in Alg. 2 (Appendix C).

Given $\tilde{b}[X_{k+l|k}]$, we can extract all future beliefs, i.e. k+l+1:k+L, from planning time k which originate in $\tilde{b}[X_{k+l|k}]$. These beliefs are updated with the information received in inference between time instances k+1 and k+l, and predicted measurements (line 6) are selectively re-sampled to maintain a representative set of samples for the nominal distribution. In case one of the aforementioned beliefs also meets a "wildfire" condition, that is, it is sufficiently close to the posterior being estimated, it and all of its descendants are considered already updated. Once the update is complete, there is a planning horizon of just L−1 steps, i.e. to the extent of the horizon overlap, hence we need to calculate the remainder of the planning horizon from scratch, i.e. perform X-BSP for the final l steps (line 8). We are now in position to update immediate score functions (i.e., the reward or cost functions) for the updated belief and calculate the expected values (i.e., the "objective values") of the candidate actions in search of the optimal (or suboptimal) action sequence (line 10), thus completing the planning for time k+l. Hereinbelow the immediate scores calculated for the posterior beliefs are assumed to be either rewards or costs.

Since we are re-using samples from different planning sessions at planning time k+l we are required to compensate for the different measurement likelihood, through proper formulation. In the sequel we show that our problem falls within the Multiple Importance Sampling problem (see Appendix A), so we estimate the expected immediate scores (reward or cost values) using importance sampling based estimator, thus completing the planning for time k+l. As opposed to X-BSP which returns only the selected action sequence, iX-BSP is also required to return more data from the planning process in order to facilitate re-use (line 14).

3.3 Selecting Closest Branch

Figure 2:
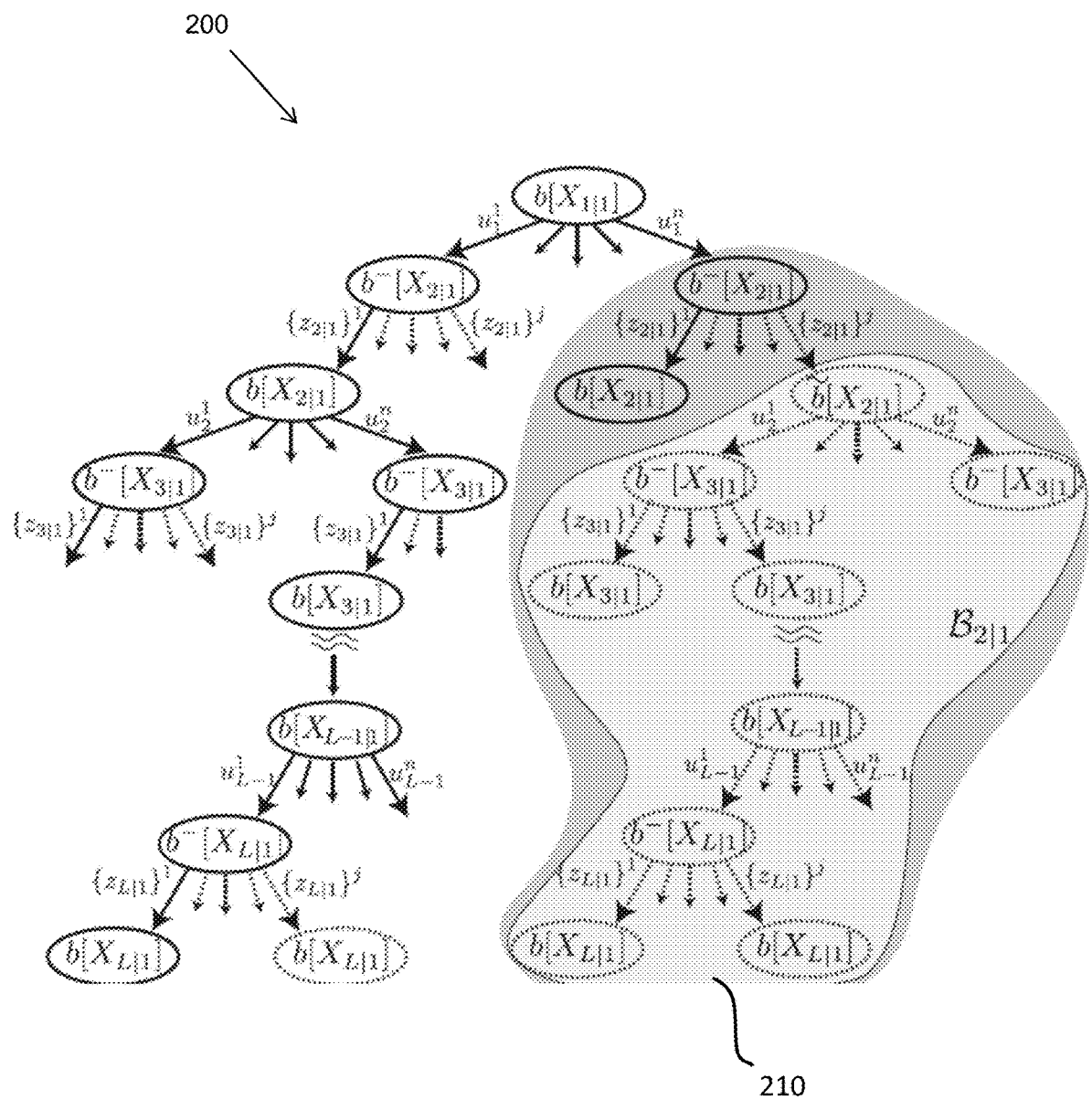
FIG. 2 illustrates a look-ahead search performed by X-BSP over a planning horizon, according to embodiments of the present invention.

FIG. 2 shows a graph 200, demonstrating a look-ahead search performed by X-BSP on a tree with depth L. Each belief tree node represents a belief. For each node, the tree branches either for a candidate action or a sampled measurement. The corresponding belief tree for ML-BSP is marked with solid lines, while the dashed lines represent the parts of X-BSP that relate to sampled measurements. Under iX-BSP, the gray-marked parts of the tree are being re-used for the succeeding planning session.

Since in X-BSP the number of beliefs per future time step is derived from the number of samples per action per time step, in order to re-use previous calculations we need to choose which beliefs to re-use. Without loss of generality, in this section we would make use of FIG. 2 to illustrate the branch selection process made in SelectClosestBranch. FIG. 2 illustrates a planning session of X-BSP at planning time t=1 for a horizon of L steps, with n candidate actions and j sampled measurements per step, resulting with $(n \cdot j)^1$ different beliefs for future time t=2 and $(n \cdot j)^{L-1}$ for future time L. Let us assume action $u_1^n$ has been determined as optimal at planning time t=1 and has been executed, after attaining new measurements for current time t=2 and calculating the posterior belief $b[X_{2|2}]$, we perform planning once more. This time, instead of calculating everything from scratch we would like to re-use the beliefs calculated at planning time t=1, but which beliefs should be considered for re-use?

Our goal in selecting beliefs for re-use is to minimize any required update, i.e. the beliefs we would like to re-use should be as "close" as possible to the beliefs we would have obtained through standard X-BSP. We can determine the distance between two beliefs through some appropriate metric, e.g. the $D_{PQ}$ metric described in Appendix B. Choosing a close belief ensures a minimal required update both for this belief and its descendants, while choosing an almost identical belief would require no update at all, as described hereinbelow with respect to locating the closest belief.

Going back to our example in FIG. 2, considering all beliefs $b[X_{2|1}]$ meeting Assumption 3, i.e. all beliefs marked by the dark gray area. We consider the closest belief as the one with the minimal distance to the posterior $b[X_{2|2}]$ and denote it as $\tilde{b}[X_{2|1}]$. Once we determined $\tilde{b}[X_{2|1}]$, we define the closest branch as consisting of all the beliefs rooted in $\tilde{b}[X_{2|1}]$, and denote it as $\mathcal{B}_{2|1}$, marked in FIG. 2 by the light gray area. The SelectClosestBranch method requires the posterior and the data from precursory planning session as inputs, and returns the root of the selected branch $\tilde{b}[X_{k+1|k}]$ along with its distance to the posterior (denoted as Dist).

3.3 Re-use Existing Beliefs

Once we determined $\tilde{b}[X_{k+1|k}]$ (Alg. 2, line 1), we consider all of its descendants as candidate beliefs for re-use from the precursory planning session and denote this set as $\mathcal{B}_{k+l|k}$. For example, in FIG. 2, the set $\mathcal{B}_{2|1}$, which is denoted by a light gray area 210, consists of all beliefs rooted in $\tilde{b}[X_{2|1}]$. Once $\mathcal{B}_{k+l|k}$ has been determined, we can utilize it following Alg. 3, to obtain all immediate scores (reward or cost values) up to time k+L while adjusting these appropriately, as discussed next. Without loss of generality, in this section we would make use of FIG. 3 to illustrate the belief update process, where FIG. 3: k represents the selected branch for re-use from FIG. 2—$\mathcal{B}_{2|1}$, and FIG. 3: k+1 illustrates the building of planning tree at time t=2 through selective re-use of beliefs from $\mathcal{B}_{2|1}$.

FIG. 3, the belief update process of iX-BSP presented in a belief tree, where each node represents a belief that branches either for one of n candidate actions or j sampled measurements. The selected branch for re-use from FIG. 2, denoted by $\mathcal{B}_{2|1}$, is presented in (a) and as a water mark in (b). The succeeding iX-BSP planning session at time t=2 is illustrated in (b), where the re-used sampled measurements and succeeding beliefs are marked in light blue.

The purpose of Alg. 3 is creating the planning tree of planning time k+1 through selective re-use of $\mathcal{B}_{k+l|k}$. The process starts with the posterior $b[X_{k+1|k+1}]$, and continue with every new belief $b^s[X_{i|k+l}]$ that is added to the new planning tree up to future time k+L, where s accommodates all different sampled beliefs at future time i.

First, we check whether the belief $b^s[X_{i|k+l}]$ was created under the wildfire condition (line 3), i.e. directly taken from $\mathcal{B}_{k+l|k}$ without any update. In case it did, we continue to take its decedents directly from the appropriate beliefs in $\mathcal{B}_{k+l|k}$ without any update (line 5) and mark them as created under the wildfire condition (line 6). For the case where the belief $b^s[X_{i|k+l}]$ has not been created under the wildfire condition we propagate it with the α candidate action, where $\alpha \in [1, n_u]$ and $n_u$ denotes the number of candidate actions per time step (line 9)—$b_\alpha^{s-}[X_{i+1|k+l}]$. We then consider all propagated beliefs $b^-[X_{i+l|k}] \subset \mathcal{B}_{k+l|k}$, and search for the closest one to $b_\alpha^{s-}[X_{i+1|k+l}]$, in the sense of belief distance. Once found, we denote the closest propagated belief as $b_\alpha^{s'-}[X_{i+l|k}]$ (line 10).

In case there is no such belief close enough to make the update worthwhile, i.e. dist>$\epsilon_c$, for this candidate action we continue as if using X-BSP (line 21). In case the distance of the closest belief meets the wildfire condition $\epsilon_{wf}$, we consider all beliefs $b[X_{i+1|k}] \subset \mathcal{B}_{k+l|k}$ that are rooted in $b^{s'-}[X_{i+1|k}]$. Otherwise we continue and check whether the samples generated using $b_\alpha^{s'-}[X_{i+1|k}]$ constitute an adequate representation for $\mathbb{P}(z_{i+1|k+l}|H_{i|k+l}, u_{i|k+l}^\alpha)$, and re-sample if needed (line 18, see Section 3.4.1). Once we obtain the updated set of samples $\{repSamples\}_1^{n_x \cdot n_z}$, whether all were freshly sampled, entirely re-used or somewhere in between, we can acquire the set of posterior beliefs for look ahead step i+1—$\{b_\alpha[X_{i+1|k+l}]\}_1^{n_x \cdot n_z}$ (line 23) through an update, as discussed in the sequel (see Section 3.4.3). Once all updated beliefs for future time i+1 have been updated, we can update the immediate scores (reward or cost values) of each posterior belief (see Section 3.4.4).

We repeat the entire process for the newly acquired beliefs $\{b_\alpha[X_{i+1|k+l}]\}_1^{n_x \cdot n_z}$, and so forth, up to k+L.

Figure 3A:
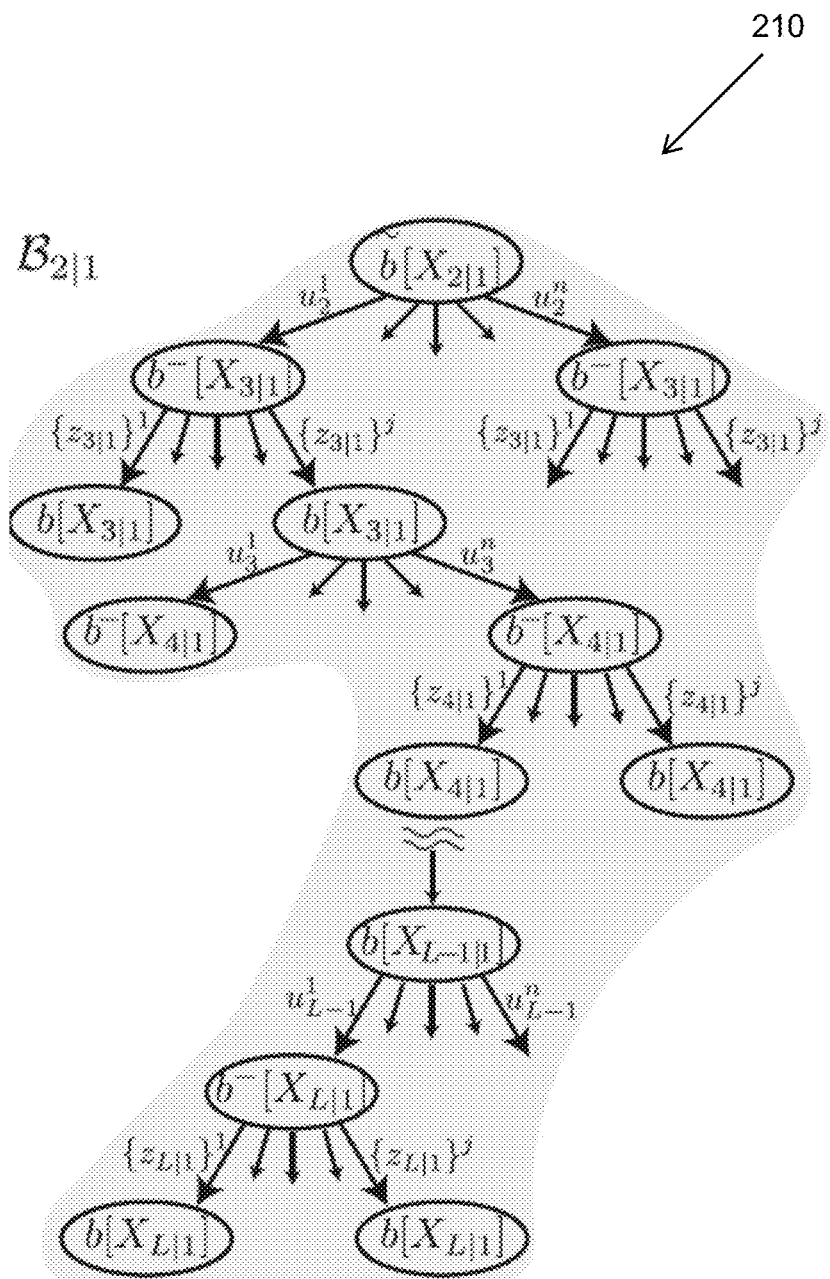
FIGS. 3A and 3B illustrates re-use of a selected branch of beliefs from a precursory planning session, according to embodiments of the present invention.
Figure 3B:
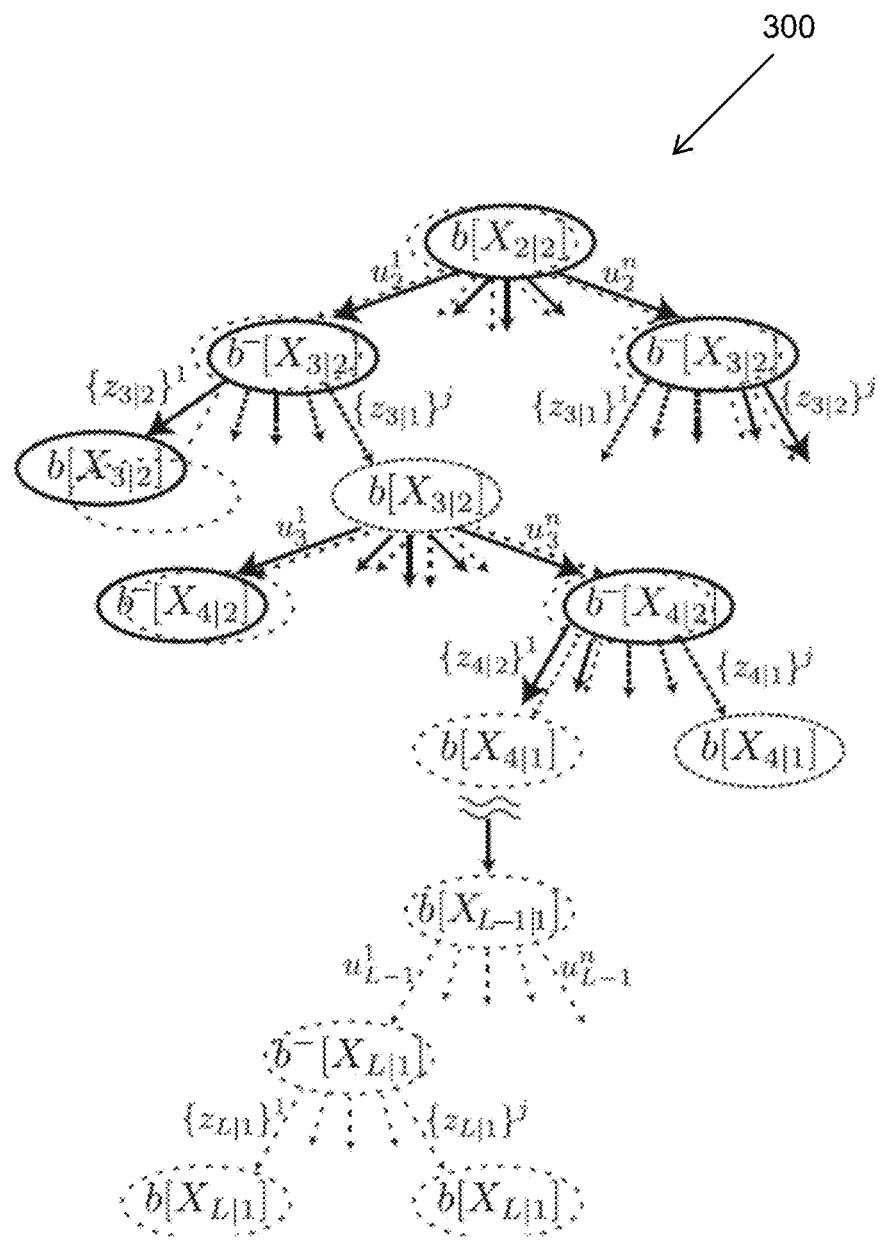

We will now demonstrate Alg. 3 (see Appendix C) using FIG. 3. FIG. 3A illustrates the selected branch for re-use from a precursory planning session at time t=1 i.e. $\mathcal{B}_{2|1}$ (see FIG. 2). There are n candidate actions each step, and for each candidate action there are j sampled measurements. FIG. 3B illustrates a part 300 of the planning tree at time t=2, where the top of the tree is the posterior belief of current time t=2, i.e. $b[X_{2|2}]$, from which we start the algorithm. Since $b[X_{2|2}]$ is the posterior of current time t=2, it was not created under the wildfire condition, so we jump directly to line 8. We propagate $b[X_{2|2}]$ with each of the n candidate actions starting with $u_2^1$, and obtain the left most belief in the second level of the tree—$b^-[X_{3|2}]$ (line 9). Using BeliefDist(•) we obtain the closest belief from $\mathcal{B}_{2|1}$ to $b^-[X_{3|2}]$ as well as their distance dist. For our example the closest belief turns out to be the one which was also propagated by the same candidate action—the left most $b^-[X_{3|1}]$ in the second level of $\mathcal{B}_{2|1}$. Since the distance suggests re-use is worth while but does not meet the wildfire condition, i.e. $\epsilon_{wf}$<dist≤$\epsilon_c$, we proceed to line 17.

We denote the set (of sets) of all j sampled measurements as samples, i.e. samples←{{$z_{3|1}$}$^1$, ..., {$z_{3|1}$}$^j$}. Using IsRepSample(•) we obtain a representative set for the measurement likelihood $\mathbb{P}(z_{3|2}|H_{2|2}, u_2^{\ 1})$ (see Section 3.4.1). As we can see in FIG. 3: k+1, other than {{$z_{3|1}$}$^1$, which was re-sampled, all other samples are re-used (denoted by blue arrows). Once we have a representative set of measurements, which in our case all but one are re-used from planning time t=1, we can update the appropriate beliefs using UpdateBelief(•) (see Section 3.4.3). The belief resulting from the newly sampled measurement {$z_{3|2}$}$^1$ is calculated from scratch by adding the measurement to $b^-[X_{3|2}]$ and performing inference, while the re-used samples allow us to incrementally update the appropriate beliefs from $\mathcal{B}_{2|1}$, rather than calculate them from scratch (see Section 3.4.3).

We now have an updated set of beliefs for future time t=3, that consider the candidate action $u_2^{\ 1}$. For each of the aforementioned beliefs we incrementally calculate the appropriate immediate scores (reward or cost values) value (see Section 3.4.4) thus completing the incremental update for candidate action $u_2^{\ 1}$. We repeat the aforementioned for the rest of the candidate actions, thus completing the third level of the planning tree presented in FIG. 3: k+1. In a similar manner we continue to incrementally calculate the deeper levels of the planning tree up to future time t=L, thus concluding Alg. 3 (Appendix C).

As the planning horizon of planning at time k concludes at look ahead step k+L, with the completion of Alg. 3, we conclude the re-use of beliefs from precursory planning session, thus obtaining the beliefs for look ahead steps k+l+1:k+L, required for immediate scores (reward or cost values) function calculation. While beliefs for the rest of the horizon k+L+1:k+L+l, are obtained by performing X-BSP (Alg. 2 (Appendix C), line 8). In the sequel we elaborate on belief distance (Section 3.4.1), determining whether samples are representative or not (Section 3.4.1), the process of belief update given the representative set of samples {repSamples}$_1^n$ (Section 3.4.3) and the incremental calculation of the immediate scores (reward or cost values) per sampled belief.

3.4.1 Locating Closest Belief

Figure 4:
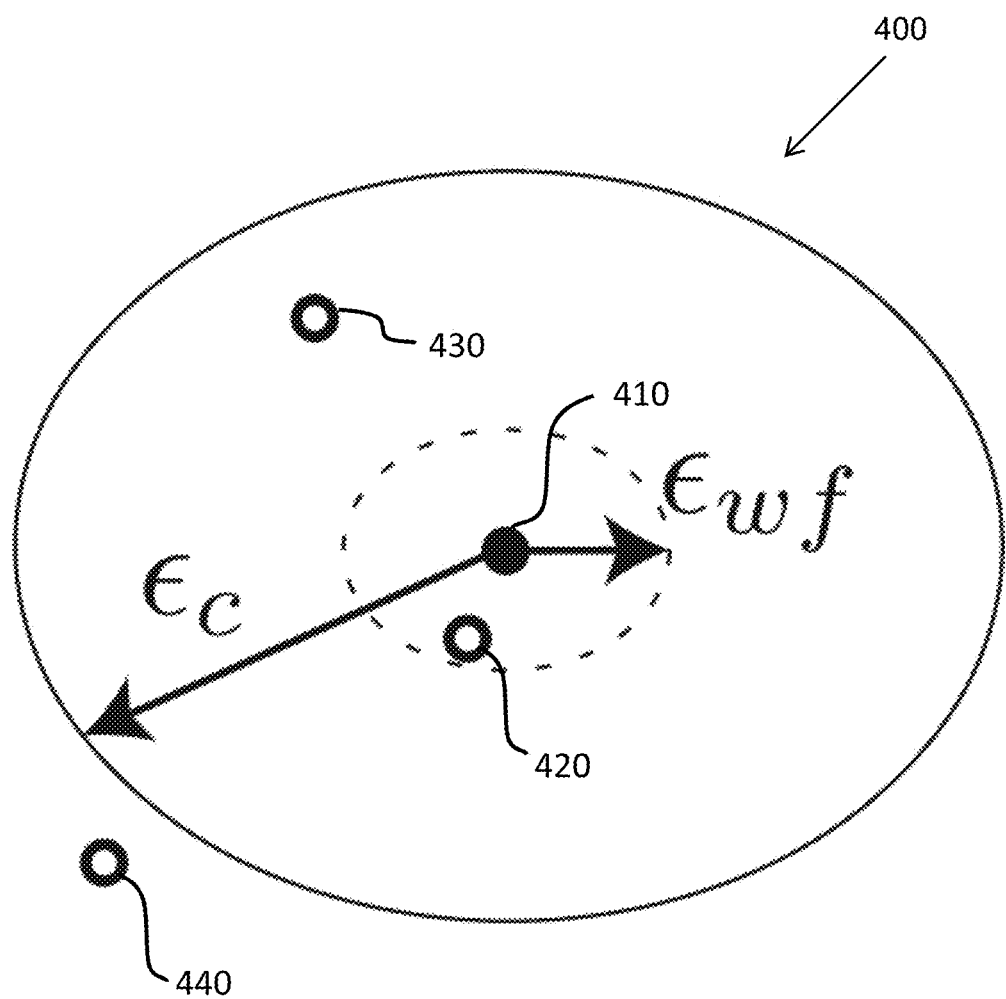
FIG. 4 illustrates a relative belief distance space, according to embodiments of the present invention.

In this section we address the problem of locating the closest belief, as required when selecting the closest branch for re-use (Alg. 2 line 1) or when re-using existing beliefs (Alg. 3 line 10) as part of iX-BSP paradigm (Alg. 2 line 6). FIG. 4 shows an illustration of the relative belief distance space. Each point in this space represents some belief $b[X_{t|k}]$, where the black dot denotes $b[X_{t|k+l}]$ as the origin. All beliefs $b[X_{t|k}]$ close to the origin up to $\epsilon_{wf}$, may be re-used without any update calculations. All beliefs $b[X_{t|k}]$ close to the origin up to $\epsilon_c$ but farther than $\epsilon_{wf}$ may be re-used with some update calculations. All beliefs $b[X_{t|k}]$ that are more than $\epsilon_c$ away from the origin are considered as not "close enough" to make a re-use worthwhile.

As part of our problem, we have a set of candidate beliefs for re-use, denoted as $\mathcal{B}_{t_k}$, and either a posterior $b[X_{t|k+l}]$ or a propagated posterior $b^-[X_{t|k+l}]$ we wish to be close to. The problem is to find the closest belief in the set $\mathcal{B}_{t_k}$ to $b[X_{t|k+l}]$. Although iX-BSP could also be performed under a non-metric distance (as discussed later in this section), the use of a belief metric allows us to have fixed criteria over the distance values, as well as utilize the advantages of metric space for computational efficiency.

A belief metric quantifies the differences between two beliefs and puts it in terms of a scalar distance. Hereinbelow, we describe one alternative for the $D_{PQ}$ metric, as presented in Endres and Schindelin, "A new metric for probability distributions," IEEE Transactions on Information Theory, 2003, incorporated herein by reference (Endres). This is a metric for general probabilities that also has a special form in the case of Gaussian beliefs (for a full derivation see Appendix B). For two Gaussian beliefs $b_p[X_{t|k+l}]$ and $b_q[X_{t|k}]$ with $\mu_p$ and $\mu_q$ as their first moments and $\Sigma_p$ and $\Sigma_q$ as their second moments appropriately, the $D_{PQ}$ distance between them is given by, $$D_{PQ}(b_p[X_{t|k+l}], b_q[X_{t|k}]) = \frac{1}{4}\sqrt{\begin{pmatrix}\mu_p - \\ \mu_q\end{pmatrix}^T \begin{bmatrix}\Sigma_q^{-1} + \\ \Sigma_p^-\end{bmatrix}(\mu_p - \mu_q) + \\ tr(\Sigma_q^{-1}\Sigma_p) + \\ tr(\Sigma_p^{-1}\Sigma_q) - d_p - d_q} \quad (19)$$

where $d_p$ and $d_q$ are the joint state dimension of $b_p[X_{t|k+l}]$ and $b_q[X_{t|k}]$ appropriately.

To locate the closest belief to $b[X_{t|k+l}]$, we may consider a belief metric space, in which each point is a unique projection of a candidate belief denoting the distance between the aforementioned candidate belief and $b[X_{t|k+l}]$. FIG. 4 illustrates such a space 400, where the black dot 410 at the center of the space represents $D_{PQ}(b[X_{t|k+l}], b[X_{t|k+l}])$, and the rest of the white points 420, 430, and 440 denote $D_{PQ}(b[X_{t|k}], b[X_{t|k+l}])$. We divide distances around the null projection into three areas, separated by threshold parameters $\epsilon_{wf}$ and $\epsilon_c$. (When wildfire is not enabled, $\epsilon_{wf}=0$ i.e. the distances are divided into two areas, separated by a single parameter $\epsilon_c$.)

For a belief from a prior planning session $b[X_{t|k}]$, although referring to the same future time t as $b[X_{t|k+l}]$, the belief is conditioned over a different history, therefore it is potentially different. While Section 3.1, discussed the reasons for such a difference between $b[X_{t|k}]$ and $b[X_{t|k+l}]$, in this section we quantify this difference using a belief metric.

Projecting $b[X_{t|k}]$ to our belief distance space yields a point that suggests how different $b[X_{t|k}]$ is from $b[X_{t|k+l}]$, e.g. the white dot 440 suggests a larger difference than the white dot 420. After projecting all candidate beliefs from $\mathcal{B}_{t|k}$ into the belief metric space in reference to $b[X_{t|k+l}]$), the problem of locating the closest belief to $b[X_{t|k+l}]$) is reduced to a problem of locating the nearest neighbor.

In order to simplify the selection process and avoid dealing with belief metric space, a straightforward method may be applied to get a qualitative distance between $\mathcal{B}_{t_k}$ and $b[X_{t|k+l}]$. We denote this method as $D_{DA}$. This is a qualitative distance and not a metric. This simplification may be relaxed to determine a distance between beliefs with a belief metric $D_{PQ}$ presented in Appendix B. Under $D_{DA}$, all candidate beliefs are first sorted according to DA differences, looking for the smallest available difference. In case there is more than a single belief with a minimal difference, we continue to sort the remaining beliefs according to the difference between values of corresponding predicted measurements and similarly look for the minimal difference. In case there is more than a single belief with minimal measurement value difference, we select arbitrarily out of the remaining beliefs, and consider the chosen belief as the closest one. A detailed explanation of the DA matching process as described in PCT application WO2019/171378.

Any method known in the art may be applied to determine the closest belief (e.g. storing the distances in a self-balancing binary search tree). Alg. 4 presents a trivial yet effective way to determine the closest belief given a set of beliefs $\mathcal{B}_{k+l|k}$ and a target belief $b[X_{i+1|k+l}]$, by simply calculating the distance between the target belief to each belief in the set $\mathcal{B}_{k+l|k}$, and picking the closest one. The distance calculation may be done using a belief metric, such as the $D_{PQ}$ distance (see Appendix B) although any proper belief metric would suffice.

A distinction as to which area $\delta_{min}$ belong to, is determined outside of Alg. 4 (see Alg. 2 lines 2-3 and Alg. 3 lines 11-12).

3.4.2 Representative Sample

This section covers the problem of obtaining a set of measurement samples that are representative of the measurement likelihood distribution from which we should sample. The motivation for re-using previously sampled measurements lies within the desire to refrain from performing inference. As explained in Section 3.1, assuming the differences between $(17)_{(b)}$ and $(18)_{(b)}$ have been resolved (the predicted factors and their counterparts that already have been obtained respectively), the difference between Eq. (17) to Eq. (18) is limited to the difference between $(17)_{(c)}$ and $(18)_{(c)}$. Assuming both use the same action sequence, the difference between $(17)_{(c)}$ and $(18)_{(c)}$ is limited to the predicted measurements being considered by each.

Under the sampling paradigm presented in Alg. 1, it is sufficient to determine the representativeness of a measurement sample based on the state sample $\chi$ which should be sampled from the propagated belief $b^-[X_{i|k+l}]$. The sampling method shown in Alg. 1 describes sampling from the unknown measurement likelihood $\mathbb{P}(z_{i|k}|H_{i|k}^-)$. We margin over all possible states and are left with Eq. (12), consisting out of two terms which we can access, the measurement model $\mathbb{P}(z_{i|k}|x_i, \mathcal{L})$ and the marginal distribution over the state at time i, $\mathbb{P}(x_i, \mathcal{L}|H^-i|k)$ obtained from $b^-[X_{i|k}]$. The sampling process is comprised of two stages. The first stage is sampling $n_x$ states for time i using the propagated belief $b^-[X_{i|k}]$, each such state defining a measurement model distribution, from which we sample $n_z$ measurements. At the end of this process we are left with $(n_x \cdot n_z)$ sampled measurements.

Considering the known (stochastic) measurement model, the space of measurement model distributions is uniquely defined by the set of state samples. So, in order to simplify the selection of representative measurement samples, we consider only the set of sampled states and assume that a set of sampled stated that are representative of the propagated belief they should have been sampled from, yields a set of representative sampled measurements. Following the aforementioned, the problem of determining a set of representative measurement samples becomes a problem of determining a set of state samples representative of some propagated belief.

Let us consider samples and $b^-[X_{i|k+l}]$ denoting respectively the candidate measurements for re-use and the propagated belief from planning time k+l. Due to the fact that samples were sampled from distributions different from $\mathbb{P}(z_{i+1|k+l}|H_{i+1|k+l}^-)$, we need to assure they constitute an adequate representation of it. In Alg. 5 we consider the sampled states that led to the acquired sampled measurements (Alg. 5 line ??), and denote it as stateSamples. We consider each sampled state separately, and determine sample $\in$ stateSamples as representative if it falls within a predetermined $\sigma$ range (e.g., a pre-determined variance range) of the distribution it should have been sampled from.

Figure 5A:
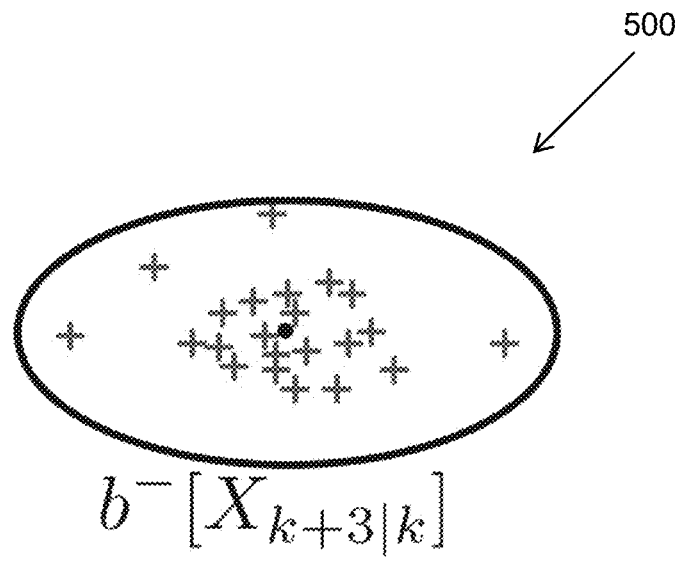
FIGS. 5A and 5B illustrate illustrate adequate and inadequate representation of a belief by measurement samples, according to embodiments of the present invention.
Figure 5B:
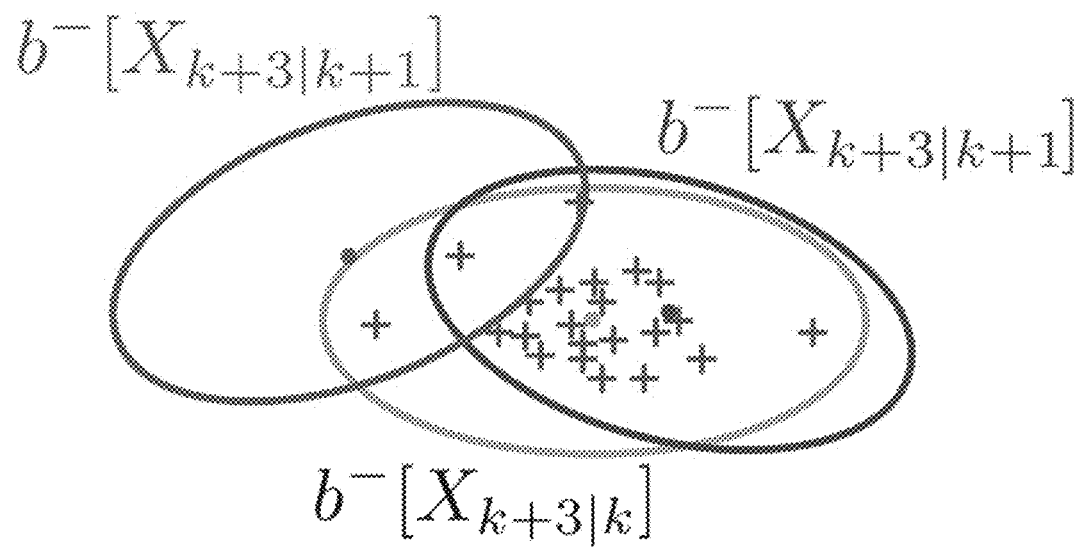

FIGS. 5A and 5B illustrate adequate and inadequate representation of a belief by samples. FIG. 5A illustrates a belief 500 (denoted by a black ellipse) over the propagated joint state at future time k+3 calculated as part of planning at time k, and twenty two samples (denoted by green "+" signs) taken from it. FIG. 5B Illustrates two instantiations of beliefs over the propagated joint state at a future time k+3 calculated as part of planning at time k+1 (denoted in red and blue), overlapping the belief 500 of the precursory planning time and its samples. While the samples of belief 500 can be considered as an adequate representation for the blue belief, they can be considered as inadequate representation of the red belief, given the dearth of samples contained within the predefined variance range. FIG. 5B illustrates a set of states $\chi$ (denoted by green "+" signs) used in future time k+3 under planning time k, where FIG. 5B illustrates how well the same samples represents two instantiations of the same future time k+3 in succeeding planning at time k+1. By considering some $\pm\beta_\sigma \cdot \sigma$ a range of each instantiation of $b^-[X_{k+3|k+1}]$ we can determine which of the available samples can be considered as representative. Following Alg. 5, for a value of $\beta_\sigma=1$, under the blue belief instantiation in FIG. 5, all but the left most sample will be considered as representative of $b^-[X_{k+3|k+1}]$ since they are within the covariance ellipsoid, representing the $\pm 1\sigma$ range. While under the red belief instantiation only the three samples within the red covariance ellipsoid will be considered as representative where the rest will be re-sampled from the nominal distribution. In order to facilitate the use of importance sampling in solving the expected immediate score (i.e., reward or cost value) one should have access to the importance sampling distributions denoted by $\{q(\bullet)\}_1^n$ in Alg. 5.

3.4.3 Belief Update as Part of Immediate Score Calculations

Once we determine a set of n samples we wish to use (Alg. 3 line 18), whether newly sampled, re-used or a mixture of both, we can then update the appropriate beliefs in order to form the set $\{b^-[X_{i+1|k+l}]\}_{r=1}^n$, required for calculating the immediate scores (i.e., reward or cost function values) at the look ahead step i+1. This section describes the belief update process, which is case sensitive to whether a sample was newly sampled or re-used. We start with the standard belief update for newly sampled measurements; continue with determining the difference between some generic belief $b[X_{i+1|k+l}]$, and its counterpart from planning time k, i.e. $b[X_{i+1|k}]$; and conclude with belief update for a re-used measurement.

For a newly sampled measurement $z_{i+1|k+l}$, we follow the standard belief update of incorporating the measurement factors to the propagated belief $b^-[X_{i+1|k+l}]$ as in $$b[X_{i+1|k+l}] \propto b^-[X_{i+1|k+l}] \cdot \prod_{j \in M_{i+1|k+l}} \mathbb{P}(z_{i+1|k+l}^j | x_{i+1}, l_j), \quad (20)$$

and then performing inference; hence no re-use of calculations from planning time k.

As mentioned earlier, the motivation for re-using samples is to evert from the costly computation time of performing inference over a belief. Since we already performed inference over beliefs at planning time k, if we re-use the same samples, we can evert from performing standard belief update (20), and utilize the beliefs from planning time k.

In summary, the necessary adjustments required to perform on a belief from planning time k that is to be re-used is as follows. The factors of two beliefs over the same future time but different planning sessions could be divided into three groups as illustrated in FIG. 1: (i) representing shared history which is by definition identical between the two; (ii) representing potentially different factors since they are predicted for time k and given for time k+l; (iii) represents future time for both, but each is conditioned over different history subject to (ii), so also potentially different.

Let us consider the measurements $z_{i+1|k} \subset \{repSamples\}_1^n$ tagged for re-use. The belief we are required to adjust is the one resulting from $z_{i+1|k}$ at planning time k, i.e.

$$b[X_{i+1|k}] \propto \mathbb{P}(X_{0:i}|H_{i|k}^-, z_{i+1|k}). \tag{21}$$

Although $b[X_{i+1|k}]$ is given to us from precursory planning it might require an update to match the new information received up to time k+l. Diverging from (20), the present approach updates $b[X_{i+1|k}]$ incrementally without performing a new inference. The process of incrementally updating a belief can be divided into two general steps: first updating the DA and then the measurement values. Let us consider the belief we wish to re-use from planning time k $$b[X_{i+1|k}] \propto \underbrace{b[X_{k|k}]}_{(a)} \cdot \underbrace{\prod_{s=k+1}^{k+l}\left[\mathbb{P}(x_s|x_{s-1}, \overset{\star}{u}_s-1) \prod_{g \in M_{s|k}} \mathbb{P}(z_{s|k}^g|x_s, l_g)\right]}_{(b)} \cdot \tag{22}$$

$$\underbrace{\prod_{r=k+l+1}^{i}\left[\mathbb{P}(x_r|x_{r-1}, \overset{\star}{u}_r-1) \prod_{j \in M_{r|k}} \mathbb{P}(z_{r|k}^j|x_r, l_j)\right] \cdot \mathbb{P}(x_{i+1}|x_i, \overset{\star}{u}_i)}_{(c)} \cdot$$

$$\underbrace{\prod_{n \in M_{i+1|k}} \mathbb{P}(z_{i+1|k}^n|x_{i+1}, l_n),}_{(d)}$$

and the propagated belief we obtained amidst building the planning tree of time k+l $$b^-[X_{i+1|k+l}] \propto \tag{23}$$

$$\underbrace{b[X_{k|k+l}]}_{(a)} \cdot \underbrace{\prod_{s=k+1}^{k+l}\left[\mathbb{P}(x_s|x_{s-1}, \overset{\star}{u}_s-1) \prod_{g \in M_{s|k+l}} \mathbb{P}(z_{s|k+l}^g|x_s, l_g)\right]}_{(b)} \cdot$$

$$\underbrace{\prod_{r=k+l+1}^{i}\left[\mathbb{P}(x_r|x_{r-1}, \overset{\star}{u}_r-1) \prod_{j \in M_{r|k+l}} \mathbb{P}(z_{r|k+l}^j|x_r, l_j)\right] \cdot \mathbb{P}(x_{i+1}|x_i, \overset{\star}{u}_i)}_{(c)}$$

The purpose of this incremental update of $b[X_{i+1|k}]$ is to obtain $b[X_{i+1|k+l}]$ such that $$b[X_{i+1|k+l}] \propto b^-[X_{i+1|k+l}] \cdot \prod_{n \in M_{i+1|k}} \mathbb{P}(z_{i+1|k}^n|x_{i+1}, l_n), \tag{24}$$

through the update of $b[X_{i+1|k}]$ rather than through the update of $b^-[X_{i+1|k+l}]$.

As discussed in Section 3.1, the only factors in Eq. (22) that do not require update are $(22)_{(a)}$, which is identical to $(23)_{(a)}$, and $(22)_{(d)}$, which is being entirely re-used, where the rest might require some update. Under the assumption that both Eq. (22) and Eq. (23) share the same action sequence, the required update is restricted to the measurement factors.

In order to update the measurement factors of $(22)_{(b)(c)}$ to match $(23)_{(b)(c)}$ we start with matching their data association (DA), $\mathcal{M}_{k+1:i|k}$ and $\mathcal{M}_{k+1:i|k+l}$ receptively. As described in PCT application WO2019/171378, to the inventors of the present invention, this DA matching provides the indices of the factors whose DA should be updated, as well as factors that should be added or removed from $\mathcal{M}_{k+1:i|k}$ in order to match $\mathcal{M}_{k+1:i|k+l}$. The DA update process is being done over the graphical representation of the belief, i.e. the factor graph. Once the DA update is complete we are left with updating the measurement values of all the consistent DA factors. In other words, the update process can be viewed as having two steps: first, evaluating an information gap which includes DA matching to determine measurements with DA to update, to add or to remove; second, performing an update of posterior belief comprises performing corresponding DA modifications to generate updated or added measurements and responsively to update one or more corresponding measurement values. For the special case of Gaussian beliefs, see PCT application WO2019/171378, cited above. Once the update is complete, n beliefs are obtained representing $b[X_{i+1|k+l}]$, each belief containing one of the n measurement samples $\{repSamples\}_1^n$.

3.4.4 Calculating Immediate Scores

Once we have a set of beliefs representing the possible futures of executing some action $u_i$ at future time i+1 (Alg. 3 line 23), we need to calculate the reward or cost value resulting from each such belief (Alg. 3 line 24) as part of the effort to solve the expected objective function. In this section we address the process of obtaining the immediate scores (reward or cost values) for each of the aforementioned beliefs, whether they were entirely re-used from a different planning session, newly calculated or a mixture of both, we conclude with the special form of weighted immediate scores (reward or cost values) function, and how can it benefit from iX-BSP paradigm. As the immediate value calculation is sensitive to the origin of the belief, we cover the three possible scenarios: newly calculated beliefs, partially re-used/updated beliefs, and entirely re-used beliefs. Let us define some general immediate scores (reward or cost values) function for planning horizon t $$r_t: \mathbb{B}, \mathbb{U} \to \mathbb{R}^1, \tag{25}$$

where $\mathbb{B}$ and $\mathbb{U}$ respectively denote belief and action For a newly calculated belief, i.e. no re-use has been made, the immediate scores (reward or cost values) is calculated in a standard manner.

when the immediate value is a linear combination of some rewards or costs we can perform re-use without recalculating the value, just changing the weights.

3.5 Incremental Expectation Calculation with Importance Sampling

Once we obtained values for candidate actions along the planning horizon (Alg. 2, lines 6-8), we need to use them in order to estimate (16). Because we are selectively re-using samples from precursory planning sessions, we estimate (16) using samples not necessarily taken from $\mathbb{P}(z_{k+l+1:i|k+l}|H_{k+l|k+l}^-, u_{k+l:i-1|k+l})$, thus the formulation should be adjusted accordingly.

Applying the standard general formulation for the objective function, a simple example demonstrates iX-BSP and shows how the standard general formulation may be adjusted. We then characterize the problem as a Multiple Importance Sampling (MIS) problem, demonstrating how the same simple example is solved under an MIS formulation. We then provide a general formulation for the objective under MIS as part of iX-BSP.

Under the standard formulation for Eq. (16), sampling $(n_x \cdot n_z)$ measurements per candidate step follow Alg. 1:

$$J(u') = \sum_{i=k+l+1}^{k+l+L} \left[ \eta_{k+l+1} \sum_{\{z_{k+l+1|k+l}\}} \omega_{k+l+1}^n \left( \cdots \left( \eta_i \sum_{\{z_{i|k+l}\}} \omega_i^n \cdot r_i(b^n[X_{i|k+l}], u_{i-1|k+l}) \right) \cdots \right) \right], \quad (26)$$

where $\omega_i^n$ denotes the weight of the $n_{th}$ measurement sample for future time i, $\eta_i$ denotes the normalizer of the weights at time i such that $\eta_i^{-1} = \Sigma_{n=1}^{n_x \cdot n_z} \omega_i^n$, and $b^n[X_{i|k+l}]$ is the belief considering a specific set of samples up to future time i, i.e.

$$b^n[X_{i|k+l}] \doteq \mathbb{P}(X_i | H_{k+l|k+l}, u_{k+l:i-1|k+l}, \{z_{k+l+1|k+l}\}, \ldots, \{z_{i|k+l}\})$$

When the measurements that are used to estimate the expectation are being sampled from their nominal distributions all weights equal 1, i.e. $\omega_i^n = 1 \; \forall i, n$, and each normalizer equals the inverse of the sum of samples, i.e. $\eta_i^{-1} = n_x \cdot x_z \; \forall i$ $$J(u') = \sum_{i=k+l+1}^{k+l+L} \left[ \frac{1}{(n_x \cdot x_z)^i} \sum_{\{z_{k+l+1|k+l}\}} \cdots \sum_{\{z_{i|k+l}\}} r_i(b^n[X_{i|k+l}], u_{i-1|k+l}) \right]. \quad (28)$$

Figure 6A:
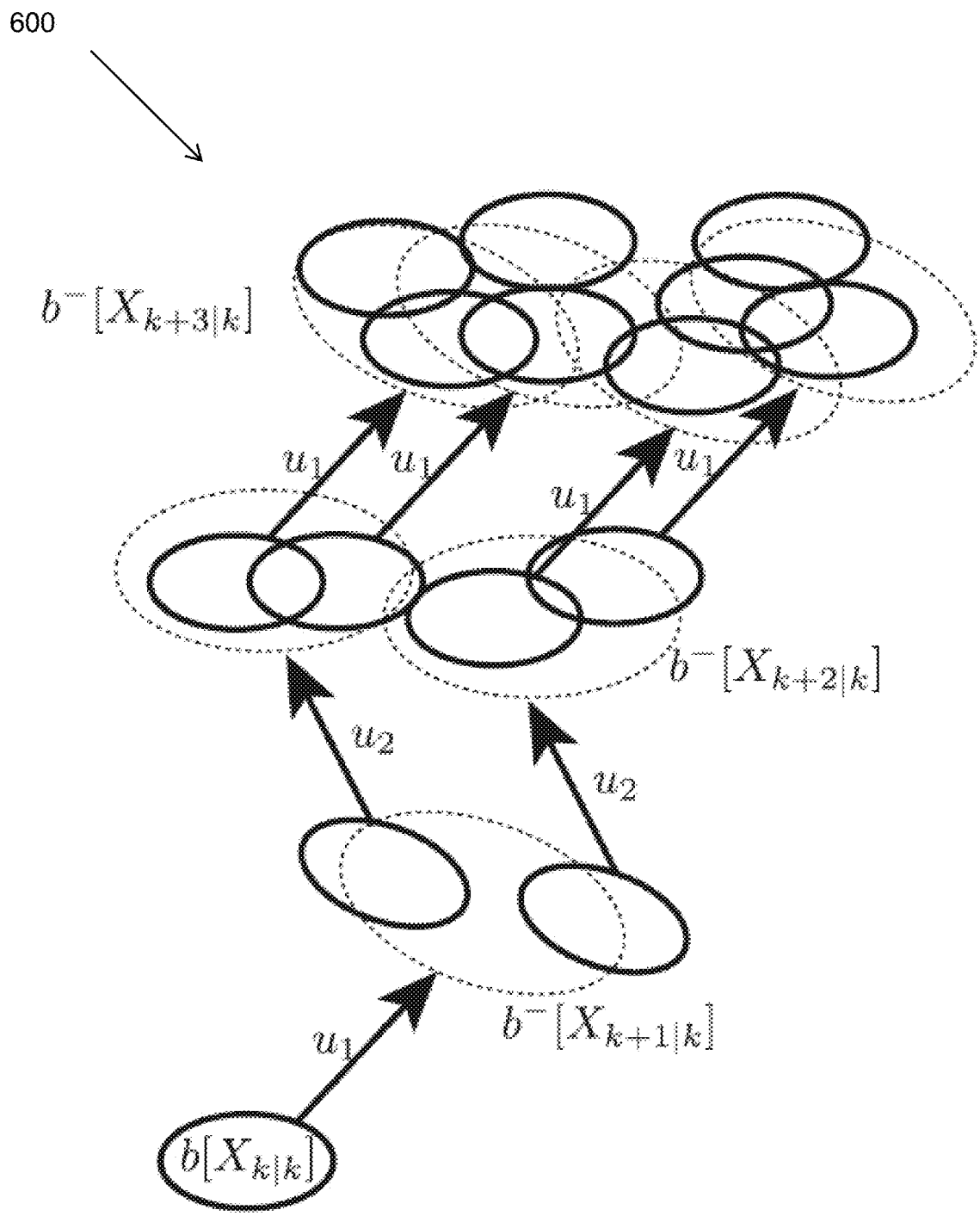
FIGS. 6A-6C illustrate re-use of beliefs over a multi-step planning horizon, for two consecutive planning sessions, according to embodiments of the present invention.

To better understand how the sampled distributions are different under iX-BSP let us perform iX-BSP over a simple example. Assume we have access to all calculations from planning time k, in-which we performed X-BSP (or ix-BSP) for a horizon of three steps, and with $n_x=2$ and $n_z=1$. FIG. 6A illustrates a specific action sequence, $u_1 \rightarrow u_2 \rightarrow u_1$, considered as part of planning at time k. Let us assume that the optimal action decided upon as part of planning at time k, and was later executed was $u_1$. We are currently at time k+1, after performing inference using the measurements we received as a result of executing $u_1$ we perform planning using iX-BSP with the same horizon length and number of samples per action, for several action sequences, one of which is the action sequence $u_2 \rightarrow u_1 \rightarrow u_2$, as illustrated in FIG. 6C.

Figure 6B:
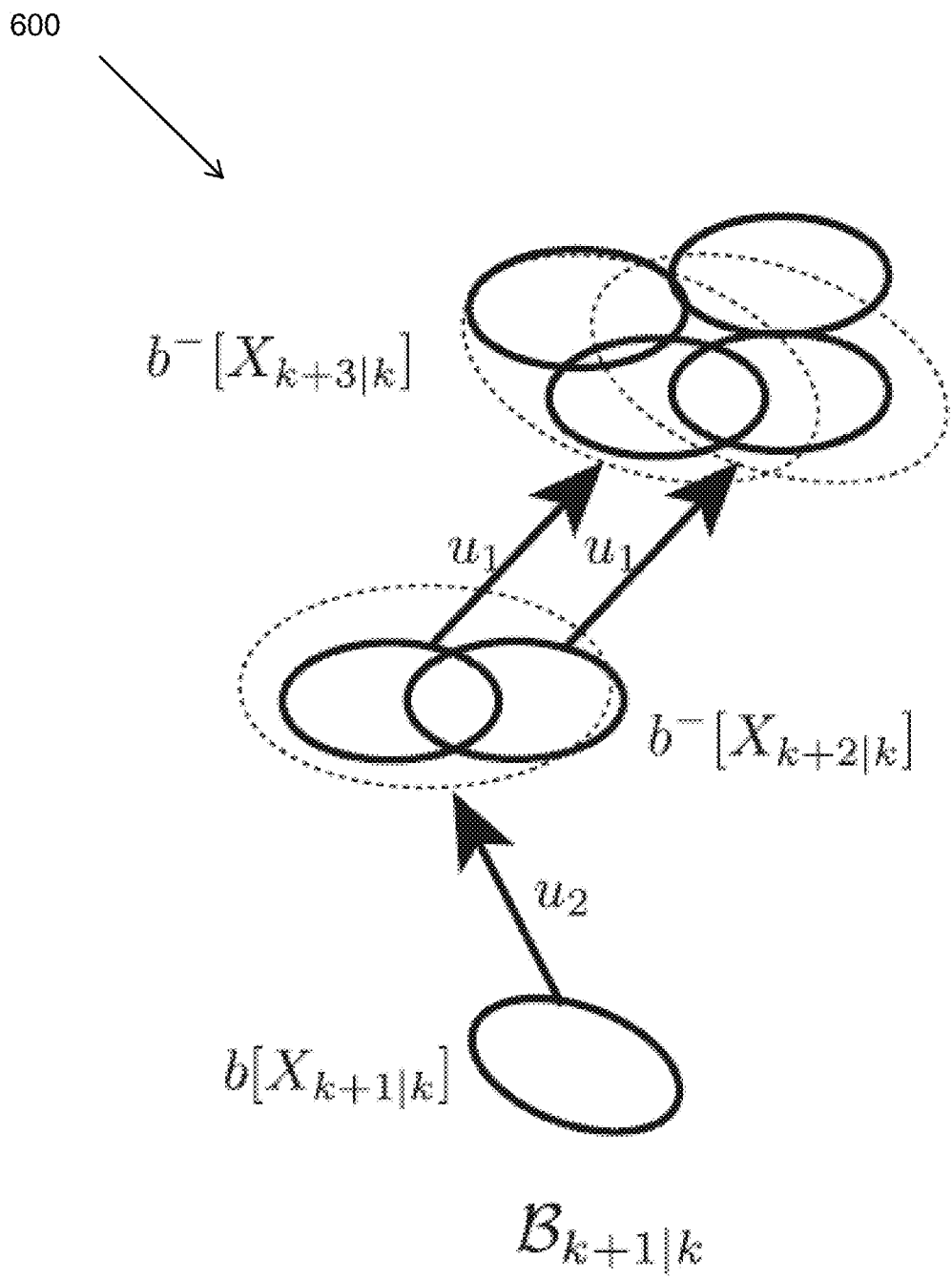

Following Alg. 2 line 1, out of the two available beliefs from planning time k FIG. 6A, $\{b[X_{k+1|k}]\}_1^2$, the left one is determined as closer to $b[X_{k+1|k+1}]$, so we consider all its descendants as the set $\mathcal{B}_{k+1|k}$, as illustrated in FIG. 6B, and denote the distance between $b[X_{k+1|k}]$ and $b[X_{k+1|k+1}]$ as Dist. Because Dist is determined as close enough for re-use, we can continue with re-using the beliefs in the set $\mathcal{B}_{k+1|k}$ (Alg. 2 line 6). First we check which of the two available sampled measurements from planning time k constitute adequate representation for $\mathbb{P}(z_{k+2}|H_{k+1|k+1}, u_2)$. One way to do so, is following Alg. 5 and checking whether the two available state samples from planning time k constitute an adequate representation for $b^-[X_{k+2|k+1}]$; since they are, we consider all measurements associated to them as a representative set of $\mathbb{P}(z_{k+2}|H_{k+1|k+1}, u_2)$.

Figure 6C:
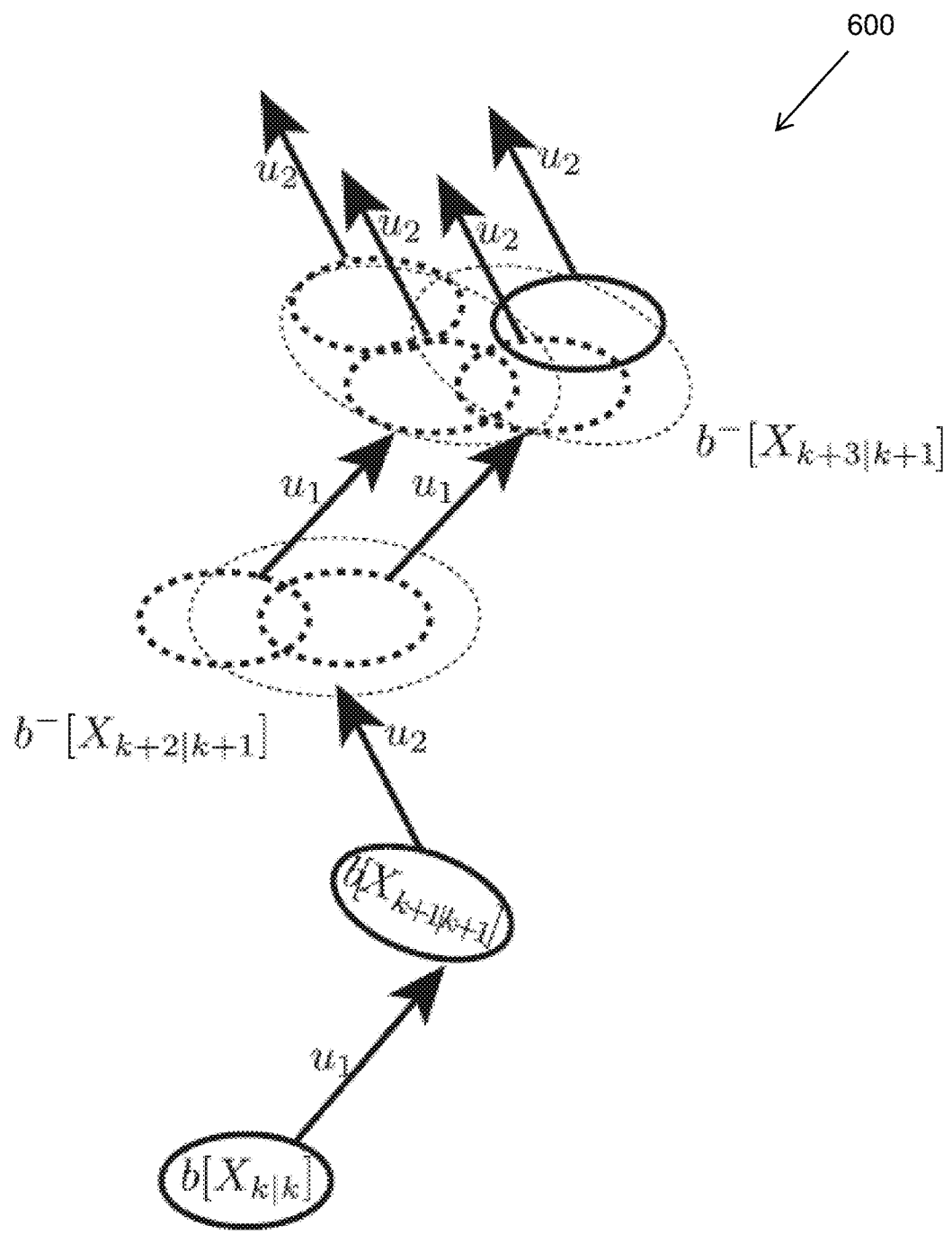

Our representative set of measurement samples for look ahead step k+2 now holds two re-used measurements, so we update their corresponding beliefs $\{b[X_{k+2|k}]\}_1^2$ into $\{b[X_{k+2|k+1}]\}_1^2$ (Alg. 3 line 23), the updated beliefs are denoted by thick dashed ellipses in FIG. 6C. After updating the beliefs we can calculate/update the immediate scores associated with them, see Section 3.4.4, once obtained we can proceed to the next future time step.

For the next look ahead step, we propagate $\{b[X_{k+2|k+1}]\}_1^2$ with action $u_1$ to obtain $\{b^-[X_{k+3|k+1}]\}_1^2$ (Alg. 3 line 9), and check whether the four available measurement samples from planning time k constitute an adequate representation for $\mathbb{P}(z_{k+3}|H_{k+2|k+1}, u_1)$ (Alg. 3 line 18); following Alg. 5 we find only three of them are, so we mark the associated beliefs for re-use, and sample the forth measurement from the original distribution $\mathbb{P}(z_{k+3}|H_{k+2|k+1}, u_1)$. We then update the beliefs we marked for re-use, $\{b[X_{k+3|k}]\}_1^3$ into $\{b[X_{k+3|k+1}]\}_1^3$ (denoted by the beliefs in thick dashed ellipses at k+3|k+1 in FIG. 6C, and $b^-[X_{k+3|k+1}]$ into $b^4[X_{k+3|k+1}]$ (denoted by the black colored belief at k+3|k+1 in FIG. 6C) using the newly sampled measurement (Alg. 3 line 23). After obtaining the beliefs for look ahead step k+3, whether through updating a re-used belief or calculation from scratch, we calculate/update the immediate scores of each. Since we do not have candidate beliefs to be re-used for the next time step, the last step of the horizon k+4|k+1 is calculated using X-BSP (Alg. 2 line 8).

At this point we have all the immediate scores for each of the predicted beliefs along the action sequence $u_2 \rightarrow u_1 \rightarrow u_2$, so we can calculate the expected reward (or cost) value for this action sequence for planning at time k+1. For the look ahead step k+2 of planning session at time k+1, i.e. k+2|k+1, we have two immediate scores, $\{r_{k+2|k+1}(b[X_{k+2|k+1}], u_2)\}_1^2$, each calculated for a different belief $b[X_{k+2|k+1}]$ considering a different sample $z_{k+2|k}$. Calculating the expected reward (cost) value for future time step k+2|k+1 would mean in this case, using measurements sampled from $\mathbb{P}(z_{k+2}|H_{k+1|k}, u_2)$ rather then from $\mathbb{P}(z_{k+2}|H_{k+1|k+1}, u_2)$. This problem, of performing estimation using forced samples is called importance sampling. Since for a single time step we might have samples from multiple different distributions, e.g. look ahead step k+3|k+1 in FIG. 6C, our problem falls within the special case of Multiple Importance Sampling (MIS) (see Appendix A).

The use of MIS enables us to calculate expectation while sampling from a mixture of probabilities, where the balance heuristic is used to calculate the weight functions in MIS. Using the formulation of MIS along with the balance heuristic presented in Eq. (41), we can write down the estimation for the expected reward value of look ahead step k+2|k+1, $$\mathbb{E}[r_{k+2|k+1}(.)] \sim \frac{1}{2} \frac{p_1(z_{k+2|k}^1)}{\frac{2}{2} q_1(z_{k+2|k}^1)} \cdot r_{k+2|k+1}^1(.) + \frac{1}{2} \frac{p_1(z_{k+2|k}^2)}{\frac{2}{2} q_1(z_{k+2|k}^2)} \cdot r_{k+2|k+1}^2(.), \quad (29)$$

where $p_1(\bullet) \doteq \mathbb{P}(z_{k+2}|H_{k+1|k+1}, u_2)$ and $q_1(\bullet) \doteq \mathbb{P}(z_{k+2}|H_{k+1|k}, u_2)$.

In the same manner, following (41), we can also write down the estimation for the expected reward(cost) value at look ahead step k+3 of planning at time k+1, i.e. k+3|k+1, $$\mathbb{E}[r_{k+3|k+1}(.)] \sim \qquad (30)$$

$$\frac{1}{4} \frac{\tilde{p}_2(z_{k+2:k+3|k}^1)}{\frac{3}{4}\tilde{q}_2(z_{k+2:k+3|k}^1) + \frac{1}{4}\tilde{p}_2(z_{k+2:k+3|k}^1)} r_{k+3|k+1}^1(.) + \frac{1}{4} \frac{\tilde{p}_2(z_{k+2:k+3|k}^2)}{\frac{3}{4}\tilde{q}_2(z_{k+2:k+3|k}^2) + \frac{1}{4}\tilde{p}_2(z_{k+2:k+3|k}^2)} r_{k+3|k+1}^2(.) +$$

$$\frac{1}{4} \frac{\tilde{p}_2(z_{k+2:k+3|k}^3)}{\frac{3}{4}\tilde{q}_2(z_{k+2:k+3|k}^3) + \frac{1}{4}\tilde{p}_2(z_{k+2:k+3|k}^3)} r_{k+3|k+1}^3(.) + \frac{1}{4} \frac{\tilde{p}_2(z_{k+2:k+3|k+1}^4)}{\frac{3}{4}\tilde{q}_2(z_{k+2:k+3|k+1}^4) + \frac{1}{4}\tilde{p}_2(z_{k+2:k+3|k+1}^4)} r_{k+3|k+1}^4(.),$$

where $\tilde{p}_2(\bullet) \doteq \mathbb{P}(z_{k+2:k+3}|H_{k+1|k+1}, u_2, u_1)$ and $\tilde{q}_2(\bullet) \doteq \mathbb{P}(z_{k+2:k+3}|H_{k+1|k}, u_2, u_1)$. When considering (9), we can re-write the measurement likelihood from (30) into a product of measurement likelihoods per look ahead step, e.g. $\tilde{p}_2(z_{k+2:k+3|k}^1) = p_1(z_{k+2|k}^1) p_2(z_{k+3|k}^1)$, $$\mathbb{E}[r_{k+3|k+1}(.)] \sim \frac{1}{4} \qquad (31)$$

$$\frac{p_1(z_{k+2|k}^1) p_2(z_{k+3|k}^1)}{\frac{3}{4} q_1(z_{k+2|k}^1) q_2(z_{k+3|k}^1) + \frac{1}{4} p_1(z_{k+2|k}^1) p_2(z_{k+3|k}^1)} r_{k+3|k+1}^1(.) +$$

$$\frac{1}{4} \frac{p_1(z_{k+2|k}^1) p_2(z_{k+3|k}^2)}{\frac{3}{4} q_1(z_{k+2|k}^1) q_2(z_{k+3|k}^2) + \frac{1}{4} p_1(z_{k+2|k}^1) p_2(z_{k+3|k}^2)} r_{k+3|k+1}^2(.) +$$

$$\frac{1}{4} \frac{p_1(z_{k+2|k}^2) p_2(z_{k+3|k}^3)}{\frac{3}{4} q_1(z_{k+2|k}^2) q_2(z_{k+3|k}^3) + \frac{1}{4} p_1(z_{k+2|k}^2) p_2(z_{k+3|k}^3)} r_{k+3|k+1}^3(.) +$$

$$\frac{1}{4} \frac{p_1(z_{k+2|k}^2) p_2(z_{k+3|k}^4)}{\frac{3}{4} q_1(z_{k+2|k}^2) q_2(z_{k+3|k}^4) + \frac{1}{4} p_1(z_{k+2|k}^2) p_2(z_{k+3|k}^4)} r_{k+3|k+1}^4(.),$$

where $p_1(\bullet)$ need not be calculated at look ahead step k+3, since it is already given from (29).

We may now formulate, for the general case, the estimator for (16) based on the MIS problem:

$$J(u') \sim \qquad (32)$$

$$\sum_{i=k+l+1}^{k+l+L} \left[ \sum_{m=1}^{M_i} \frac{1}{n_m} \sum_{g=1}^{n_m} \tilde{w}_m(z_{k+l+1:i}^{m,g}) \cdot \frac{\mathbb{P}(z_{k+l+1:i}^{m,g} | H_{k+l|k+l}, u_{k+l:i-1|k+l})}{q_m(z_{k+l+1:i}^{m,g})} \cdot r_i(b[X_{i|k+l}], u'_{i-1|k+l}) \right],$$

where $M_i$ is the number of distributions at look ahead step i from which measurements are being sampled, $n_m$ is the number of measurements sampled from the $m_{th}$ distribution at look ahead step i, $q_m(\bullet)$ is the $m_{th}$ distribution at look ahead step i that samples were taken from, and $z_{k+l+1:i}^{m,g}$ are the $g_{th}$ set of future measurements at time instances k+l+1:i, sampled from the $m_{th}$ distribution. The $m_{th}$ weight is denoted by $\tilde{w}_m$ where $\Sigma \tilde{w}_m = 1$, and $\tilde{w}_m > 0 \forall m$. This estimator (32) is unbiased under the assumption that $q_m(\bullet) > 0$ whenever $\tilde{w}_m(\ )\cdot \mathbb{P}(z|H) \cdot r_i(\bullet) \neq 0$.

We may make use of an unbiased nearly optimal estimator for (16), based on the multiple importance sampling problem with the balance heuristic (see Appendix A)

$$J(u') \sim \sum_{i=k+l+1}^{k+l+L} \left[ \frac{1}{n_i} \sum_{m=1}^{M_i} \sum_{g=1}^{n_m} w_i(z_{k+l+1:i}^{m,g}) \cdot r_i(b[X_{i|k+l}], u'_{i-1|k+l}) \right], \qquad (33)$$

where $n_i$ are the number of samples considered at look ahead step i, $M_i$ is the number of distributions at look ahead step i from which measurements are being sampled, $n_m$ is the number of measurements sampled from the $m_{th}$ distribution, and following the balance heuristic $w_{m,g}^i$ is the likelihood ratio of the $g_{th}$ sample from the $m_{th}$ distribution at look ahead step i given by $$w_i(z_{k+l+1:i}^{m,g}) = \frac{\mathbb{P}(z_{k+l+1:i}^{m,g} | H_{k+l|1:i}, u_{k+l:i-1|k+l})}{\sum_{\tilde{m}=1}^{M_i} \frac{n_{\tilde{m}}}{n_i} q_{\tilde{m}}(z_{k+l+1:i}^{m,g})}, \qquad (34)$$

where $z_{k+l+1:i}^{m,g}$ are the $g_{th}$ set of future measurements at time instances k+l+1:i, sampled from the $m_{th}$ distribution, and $q_{th}(\bullet)$ is the $\tilde{m}_{th}$ distribution.

When all samples being considered to estimate (16) are sampled from their nominals distributions, (33) is reduced back to the formulation of X-BSP, with all the weights degenerating to ones, for such a case, $M_i = 1 \ \forall i$, and $q_1(\bullet) = \mathbb{P}(z_{k+l+1:i}|H_{k+l|k+l}, u_{k+l:i-1|k+l})$, thus $w_i = 1 \ \forall i$.

3.6 Incremental ML BSP

Since our novel approach changes the solution paradigm for the original, un-approximated, problem (X-BSP), we claim it could be utilized to also reduce computation time of existing approximations of X-BSP. To support our claim, in this section we present the implementation of iX-BSP principles over the most commonly used approximation, ML-BSP, and we denote iX-BSP under the ML assumption as iML-BSP.

Under the ML assumption we consider just the most likely measurements, rather than sampling multiple measurements, hence $M_i = 1 \ \forall i$, because a single measurement is considered for each action at each time step. Considering the aforementioned, for the case of iML-BSP, Eq. (33) is reduced to $$J(u') \sim \sum_{i=k+l+1}^{k+l+L} [w_i \cdot r_i(b[X_{i|k+l}], u'_{i-1|k+l})], \qquad (35)$$

and Eq. (34), representing the weight at time i is reduced to $$w_i = \frac{\mathbb{P}(z_{k+l+1:i} | H_{k+l|k+l}, u_{k+l:i-1|k+l})}{q(z_{k+l+1:i})}, \qquad (36)$$

where q(•) is the pdf from which the measurement set $z_{k+l+1:i}$, was sampled.

3.7 Full Inference and Planning Session

Figure 7:
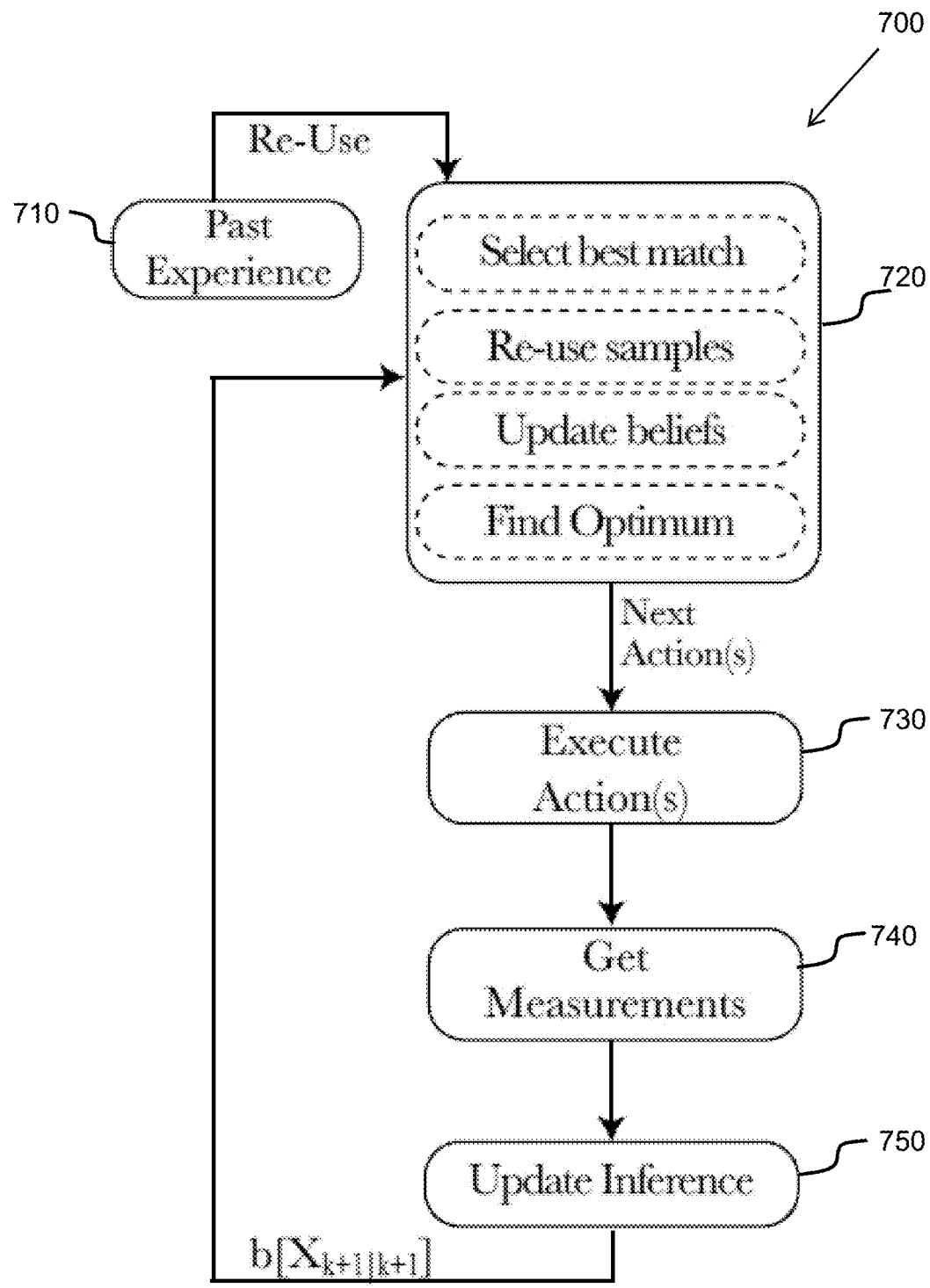
FIG. 7 illustrates a flowchart of belief space planning through incremental expectation updating, according to embodiments of the present invention.

FIG. 7 illustrates a flowchart 700 of belief space planning through incremental expectation updating, summarizing the process described above (Sections 3.0-3.6), according to embodiments of the present invention. FIG. 7 indicates how the standard process of plan-act-measure-infer of BSP is modified by embodiments of the present invention. Instead of calculating BSP from scratch at each planning session, calculations are re-used from past experience (e.g., precursory planning sessions). The calculations to be re-used are stored for subsequent re-use at a preparation step 710. Stored calculations include previously evaluated beliefs, that is, propagated beliefs, together with subsequent belief nodes of planning horizons, including measurement samples. At a planning step 720 a planning session then proceeds with four key sub-steps, as follows.

First from the set of stored propagated beliefs, a "closest" or "best matching" stored propagated belief is selected, as best corresponding to the current ("new") propagated belief from which planning is proceeding. Stored measurement samples associated with the closest propagated belief are then re-used, after ensuring that the measurement samples provide a representative set of a measurement likelihood distribution of the new propagated belief. Typically, the process of selecting the best match is iterative over time steps of the planning horizon.

For each measurement sample stored with each best matching belief, an information gap is determined (the gap of data between the stored posterior belief associated with the re-use measurement sample and a new posterior belief that would be inferred by applying the re-use measurement sample to the new propagated belief). The posterior beliefs being re-used are then updated to account for the information gaps, and immediate scores for the posterior beliefs are calculated. If there are an insufficient number of re-usable measurement samples, new samples may be sampled as well, from which posterior beliefs are inferred by full calculations without reuse.

Subsequently, for multiple candidate action sequences, extending over the planning horizon, objective values are calculated as weighted sums including the immediate scores of the updated posterior beliefs. An optimal action from among the multiple candidate actions is then selected as the candidate action with the optimal objective value.

The updated and newly calculated beliefs of step 720 can then be added to the stored values of "past experience" of step 710. Then, at steps 730 through 750, the standard BSP processes of act (730), measure (740), and infer (750) are implemented, and the next planning session is then repeated.

APPENDIX A: MULTIPLE IMPORTANCE SAMPLING

Let us assume we wish to express expectation over some function $f(x)$ with respect to distribution $p(x)$, by sampling $x$ from a different distribution $q(x)$, $$\mathbb{E}_p f(x) = \int f(x) \cdot p(x) dx = \int \frac{f(x) \cdot p(x)}{q(x)} q(x) dx = \mathbb{E}_q \left( \frac{f(x) \cdot p(x)}{q(x)} \right). \quad (37)$$

Eq. (37) presents the basic importance sampling problem, where $\mathbb{E}_q$ denotes expectation for $x \sim q(x)$. The probability ratio between the nominal distribution p and the importance sampling distribution q is usually referred to as the likelihood ratio. Our problem is more complex, since our samples are potentially taken from M different distributions while $M \in [1, (n_x \cdot n_z)^L]$, i.e. a multiple importance sampling problem $$\mathbb{E}_p f(x) = \tilde{\mu}(x) \sim \sum_{m=1}^{M} \frac{1}{n_m} \sum_{i=1}^{n_m} w_m(x_{im}) \frac{f(x_{im}) p(x_{im})}{q_m(x_{im})}, \quad (38)$$

where $w_m(\cdot)$ are weight functions satisfying $\sum_{m=1}^{M} w_m(x)=1$. For $q_m(x) > 0$ whenever $w_m(x) p(x) f(x) \neq 0$, Eq. (38) forms an unbiased estimator $$\mathbb{E}[\tilde{\mu}(x)] = \sum_{m=1}^{M} \mathbb{E}_{q_m} \left[ \frac{1}{n_m} \sum_{i=1}^{n_m} w_m(x_{im}) \frac{f(x_{im}) p(x_{im})}{q_m(x_{im})} \right] = \tilde{\mu}(x). \quad (39)$$

Although there are numerous options for weight functions satisfying $\sum_{m=1}^{M} w_m(x)=1$, we apply here the Balance Heuristic, considered to be nearly optimal in the sense of estimation variance, $$w_m(x) = w_m^{BH}(x) = \frac{n_m q_m(x)}{\sum_{s=1}^{M} n_s q_s(x)}. \quad (40)$$

Using (40) in (38) produces the multiple importance sampling with the balance heuristic $$\mathbb{E}_p f(x) \sim \frac{1}{n} \sum_{m=1}^{M} \sum_{i=1}^{n_m} \frac{p(x_{im})}{\sum_{s=1}^{M} \frac{n_s}{n} q_s(x_{im})} f(x_{im}). \quad (41)$$

APPENDIX B: THE $D_{PQ}$ DISTANCE

The approach described herein requires a probability density function (pdf) metric. One possibility is to use the $D_{PQ}$ metric which was first suggested as the $D_{PQ}^2$ distance in F. Topsoe, "Some inequalities for information divergence and related measures of discrimination," IEEE Transactions on information theory, 46 (4):1602-1609, 2000, incorporated herein by reference. Application of the pdf as a metric, was described in Endres, cited above.
The $D_{PQ}$ metric is given by $$D_{PQ}(P, Q) = \sqrt{\frac{1}{2} D_{KL}(P\|Q) + \frac{1}{2} D_{KL}(Q\|P)}, \quad (42)$$

where P and Q are probability density functions and $D_{KL}(P\|Q)$ is the Kullback-Leibler (KL) divergence.

The Kullback-Leibler (KL) divergence, sometime referred to as relative entropy, measures how well some distribution Q approximates distribution P, or in other words how much information will be lost if one considers distribution Q instead of P. The KL divergence is not a metric (assymetric) and is given by $$D_{KL}(P||Q) = \int P \cdot \log\frac{P}{Q} = E_P[\log P - \log Q]. \tag{43}$$

From a view point of Bayesian Inference, the $D_{KL}(P||Q)$ metric can be interpreted as twice the expected information gain when deciding between P and Q given a uniform prior over them.

For the special case of Gaussian distributions, we can express $D_{KL}(P||Q)$ and consequently $D_{PQ}(P,Q)$ in terms of means and covariances. Let us consider two multivariate Gaussian P and Q in $\mathbb{R}^d$, with means $\mu_p$ and $\mu_q$ and covariances $\Sigma_p$ and $\Sigma_q$ respectively.

$$D_{KL}(P||Q) = \mathbb{E}_P[\log P - \log Q] = \tag{44}$$

$$\frac{1}{2}\mathbb{E}_P\left[-\log|\Sigma_p| - (x-\mu_p)^T\Sigma_p^{-1}(x-\mu_p) + \log|\Sigma_q| + (x-\mu_q)^T\Sigma_q^{-1}(x-\mu_q)\right] =$$

$$\frac{1}{2}\log\frac{|\Sigma_q|}{|\Sigma_p|} + \frac{1}{2}\mathbb{E}_P\left[-(x-\mu_p)^T\Sigma_p^{-1}(x-\mu_p) + (x-\mu_q)^T\Sigma_q^{-1}(x-\mu_q)\right] =$$

$$\frac{1}{2}\log\frac{|\Sigma_q|}{|\Sigma_p|} + \frac{1}{2}\mathbb{E}_P\left[-tr\left(\Sigma_p^{-1}(x-\mu_p)^T(x-\mu_p)\right) + tr\left(\Sigma_q^{-1}(x-\mu_q)^T(x-\mu_q)\right)\right] =$$

$$\frac{1}{2}\log\frac{|\Sigma_q|}{|\Sigma_p|} - \frac{1}{2}tr\left(\Sigma_p^{-1}\Sigma_p\right) + \frac{1}{2}\mathbb{E}_P\left[tr\left(\Sigma_q^{-1}(xx^T - 2x\mu_q^T + \mu_q\mu_q^T)\right)\right] =$$

$$\frac{1}{2}\log\frac{|\Sigma_q|}{|\Sigma_p|} - \frac{1}{2}d + \frac{1}{2}tr\left(\Sigma_q^{-1}\left(\Sigma_p + \mu_p\mu_p^T - 2\mu_p\mu_q^T + \mu_q\mu_q^T\right)\right) =$$

$$\frac{1}{2}\left[\log\frac{|\Sigma_q|}{|\Sigma_p|} - d + tr\left(\Sigma_q^{-1}\Sigma_p\right) + tr\left(\Sigma_q^{-1}(\mu_p-\mu_q)^T(\mu_p-\mu_q)\right)\right] =$$

$$\frac{1}{2}\left[\log\frac{|\Sigma_q|}{|\Sigma_p|} - d + tr\left(\Sigma_q^{-1}\Sigma_p\right) + (\mu_p-\mu_q)^T\Sigma_q^{-1}(\mu_p-\mu_q)\right]$$

Substituting Eq. (44) in Eq. (42) we get the $D_{PQ}$ metric representation for the multivariate Gaussian case, $$D_{PQ}(P,Q) = \tag{45}$$

$$\sqrt{\frac{1}{2}\left[\log\frac{|\Sigma_q|}{|\Sigma_p|} - 2d + tr(\Sigma_q^{-1}\Sigma_p) + (\mu_p-\mu_q)^T[\Sigma_q^{-1}+\Sigma_p^{-1}](\mu_p-\mu_q) + \log\frac{|\Sigma_p|}{|\Sigma_q|} + tr(\Sigma_p^{-1}\Sigma_q)\right]} =$$

$$\frac{1}{4}\sqrt{(\mu_p-\mu_q)^T\left[\Sigma_q^{-1}+\Sigma_p^{-1}\right](\mu_p-\mu_q) + tr\left(\Sigma_q^{-1}\Sigma_p\right) + tr\left(\Sigma_p^{-1}\Sigma_q\right) - 2d}.$$

APPENDIX C

Algorithms

Algorithm 1 Sampling $z_{i|k} \sim \mathbb{P}(z_{i|k}|H_{i|k}^-)$
1: $\chi_i = \{x_i, \mathcal{L}\} \sim \mathbb{P}(x_i, \mathcal{L}|H_{i|k}^-)$
2: Determine data association $\mathcal{M}_{i|k}(x_i, \mathcal{L})$
3: $z_{i|k} = \{z_{i,j|k}\}_{j \in \mathcal{M}_{i|k}(\chi_i)}$ with $z_{i,j|k} \sim \mathbb{P}(z_{i,j|k}|x_i, l_j)$
4: return $z_{i|k}$ and $\chi_i$

---

Algorithm 2 iX-BSP: Planning time k+l

Input:
    data    ▷ Calculations used for the precursory planning session
    $b[X_{k+l|k+l}]$    ▷ The up-to-date inference posterior for time $k + l$ 1: Dist, $\tilde{b}[X_{k+l|k}] \leftarrow$ SELECTCLOSESTBRANCH($b[X_{k+l|k+l}]$, data)   ▷ see Section 3.3
2: if Dist $\leq \in_c$ then   ▷ belief distance threshold $\in_c$
3:     if useWF ∩ (Dist $\leq \in_{wf}$) then   ▷ wildfire threshold $\in_{wf}$
4:         data $\leftarrow \mathcal{B}_{k+l|k}$   ▷ Reusing the entire selected branch without any update
5:     else
6:         data $\leftarrow$ REUSEEXISTINGBELIEFS($\tilde{b}[X_{k+l|k}]$)   ▷ see Section 3.4
7:     end if
8:     data $\leftarrow$ perform X-BSP over horizon steps $k + L + 1 : k + L + l$
9:     Solve Eq. 11, for each candidate action   ▷ see Section 3.5
10:     $u_{k+i:k+L|k+i}^{\star} \leftarrow$ find best action
11: else
12:     $u_{k+i:k+L|k+i}^{\star} \leftarrow$ perform X-BSP($b[X_{k+l|k+l}]$)
13: end if
14: return $u_{k+i:k+L|k+i}^{\star}$, data

---

Algorithm 3 reuseExistingBeliefs

Input:
    $\tilde{b}[X_{k+l|k}]$   ▷ The root node of the selected branch, see Section 3.3

1: for each $i \in [k + l, k + L - 1]$ do   ▷ each overlapping horizon step
2:     for each $s \in [1, n_u \cdot (n_x \cdot n_z)^{i-k-l}]$ do   ▷ each belief in the $i_{th}$ horizon step
3:         if useWF ∩ ISWILDFIRE($b^s[X_{i|k+l}]$) then
4:             $r_0 \leftarrow (s-1) \cdot n_u \cdot (n_x \cdot n_z)$
5:             $\{b^r[X_{i+1|k+l}]\}_{r=r_0+1}^{r_0+n_u \cdot (n_x \cdot n_z)} \leftarrow$ all first order children of $b^s[X_{i|k}]$  ▷ wildfire condition
6:             mark all $\{b^r[X_{i+1|k+l}]\}_{r=r_0+1}^{r_0+n_u \cdot (n_x \cdot n_z)}$ as wildfire
7:         else
8:             for each candidate action $\alpha \in [1, n_u]$ do
9:                 $b_{\alpha}^{s-}[X_{i+1|k+l}] \leftarrow$ propagate $b^s[X_{i|k+l}]$ with candidate action $\alpha$
10:                dist, $b_{\alpha}^{s-}[X_{i+1|k}] \leftarrow$ CLOSESTBELIEF($\mathcal{B}_{k+l|k}, b_{\alpha}^{s-}[X_{i+1|k+l}]$)  ▷ see Section 3.4.1
11:                if dist $\leq \in_c$ then   ▷ re-use condition
12:                   if useWF ∩ (dist $\leq \in_{wf}$) then   ▷ wildfire condition
13:                       $\{b_{\alpha}^{r-}[X_{i+1|k+l}]\}_{r=1}^{n_x \cdot n_z} \leftarrow$ all first order chilren of $b_{\alpha}^{s-}[X_{i+1|k}]$  ▷ wildfire condition
14:                       mark $\{b_{\alpha}^{r}[X_{i+1|k+l}]\}_{r=1}^{n_x \cdot n_z}$ as wildfire
15:                       Continue with next candidate action (i.e. jump to line 8)
16:                 else
17:                       samples $\leftarrow$ all samples taken from $b_{\alpha}^{s-}[X_{i+1|k}]$
18:                       $\{repSamples\}_1^{n_x n_z}$, data $\leftarrow$ ISREPSAMPLE(samples, $b_{\alpha}^{s-}[X_{i+1|k+l}]$) ▷ see Section
19:                 end if
20:                else   ▷ not computationally effective to re-use, resample all
21:                   $\{repSamples\}_1^{n_x n_z}$, data $\leftarrow$ $(n_x \cdot n_z)$ fresh samples based on $b_{\alpha}^{s-}[X_{i+1|k+l}]$ ▷ see Alg. 1
22:                 end if
23:                 data $\leftarrow$ UPDATEBELIEF(dist, $\{repSamples\}_1^{n_x n_z}$, data) ▷ see Section
24:                 data $\leftarrow$ update objective value for $\alpha$ ▷ see Section 3.4.4
25:             end for
26:         end if
27:     end for
28: end for
29: return data ---
Algorithm 4 ClosestBelief
---

Input:
    $\mathcal{B}_{k+l|k}$     ▷ set of candidate beliefs for re-use from planning at time k, see Section 3.3
    $b[X_{i+1|k+1}]$     ▷ The belief to check distance to, from planning at time k + 1
1: $\delta_{min} = 0$
2: for $b[X_{i+1|k}] \in \mathcal{B}_{k+l|k}$ do
3:     $\delta \leftarrow$ BELIEFMETRIC($b[X_{i+1|k}]$, $b[X_{i+1|k+1}]$)     ▷ probability metric to determine belief distance
4:     if $\delta \leq \delta_{min}$ then     ▷ keeping track over the shortest distance
5:         if $\delta_{min} \leftarrow \delta$
6:         $b'[X_{i+1|k}] \leftarrow b[X_{i+1|k}]$
7:     end if
8: end for
9: return $\delta_{min}$, $b'[X_{i+1|k}]$ ---
Algorithm 5 IsRepSample
---

Input:
    samples     ▷ set of candidate samples for re-use from planning at time k, see Alg 3 line 17
    $b^-[X_{i|k+1}]$     ▷ The belief from planning time k + 1 the samples should be representing, i.e. sampled from
1: Given $\beta_\sigma = 1.5$     ▷ User determined Heuristic, in direct proportion to acceptance
2: for each sample $\in$ samples do
3:     if sample $\subset \pm\beta_\sigma \cdot \sigma$ of $b^-[X_{i|k+1}]$ then
4:         flag sample for re-use     ▷ The sample falls within $\pm\beta_\sigma \cdot \sigma$ range, hence accepted
5:     else     ▷ The sample falls outside the $\pm\beta_\sigma \cdot \sigma$ range, hence rejected
6:         re-sample measurement using $b^-[X_{i|k+1}]$     ▷ freshly sampled, see Alg. 1
7:     end if
8: end for
9: return $\{repSamples\}_1^n$, $\{q(.)\}_1^n$     ▷ $\{q(.)\}_1^n$ represent the PDFs from which the $\{repSamples\}_1^n$ were taken

What is claimed:

1. A system of decision making under uncertainty, for selecting an optimal action from among multiple candidate actions, the system comprising a processor and an associated memory storing instructions, which when executed by the processor implement steps comprising:
  A) from a current belief, inferring multiple new propagated beliefs according to the respective multiple candidate actions;
  B) accessing a stored set of propagated beliefs, wherein each given stored propagated belief is associated with one or more stored measurement samples and with one or more respective stored posterior beliefs inferred from the given stored propagated belief according to a respective measurement sample, wherein the stored propagated beliefs were propagated from prior beliefs during one or more precursory planning sessions at one or more respective previous times;
  C) for each new propagated belief generated for a respective candidate action: selecting from the set of stored propagated beliefs a closest stored propagated belief; selecting, from among the one or more stored measurement samples associated with the closest stored propagated belief, re-use measurement samples for a representative set of a measurement likelihood distribution corresponding to the new propagated belief;
  D) for each re-use measurement sample: determining an information gap between the stored posterior belief associated with the re-use measurement sample and a new posterior belief that would be inferred by applying the re-use measurement sample to the new propagated belief; responsively updating the stored posterior belief to account for the information gap and associating the new propagated belief with the updated posterior belief; calculating an immediate score for the updated posterior belief associated with the new propagated belief;
  E) subsequently, calculating objective values for the multiple candidate actions, wherein the calculation of the objective values is a weighted summation including the immediate scores of the updated posterior beliefs; and
  F) subsequently, determining the optimal action from among the multiple candidate actions according to the candidate action with the optimal objective value.

2. The system of claim 1, further comprising newly sampling one or more additional measurement samples for one or more of the new propagated beliefs, inferring from the one or more additional measurement samples respective one or more additional posterior beliefs, calculating additional immediate scores for the one or more additional posterior beliefs; and wherein the calculation of the objective values is a summation including the immediate scores of the updated posterior beliefs and of the additional posterior beliefs.

3. The system of claim 2, wherein, selecting re-use measurement samples for the representative set comprises determining that the re-use measurement samples are an inadequate representative measurement set and that adding the additional measurement samples provides an adequate representative measurement set.

4. The system of claim 1, wherein selecting the re-use measurement samples for the representative set comprises determining which measurement samples are within a predetermined variance range of the measurement likelihood distribution.

5. The system of claim 1, further comprising determining that the information gap is less than a wildfire threshold and wherein updating the stored posterior belief to account for the information gap comprises making no updating calculations of the stored posterior belief.

6. The system of claim 5, wherein the candidate actions are sequences of actions over a planning horizon, which generate respective sequences of propagated beliefs branching from the new propagated belief, wherein the stored propagated beliefs include planning horizons including stored branches of stored propagated beliefs and associated measurements, and wherein the steps further include, upon determining that the information gap is less than a wildfire threshold, associating a stored branch of the closed stored propagated belief with the new propagated belief, with no updating of stored posterior beliefs of the stored branch.

7. The system of claim 1, wherein the stored propagated beliefs include planning horizons including stored branches of stored propagated beliefs and associated measurements, wherein a stored branch of the closest propagated belief has a planning horizon of L1, wherein a time of the closest propagated belief is k, such that the last posterior beliefs of the stored branch are associated with a time k+L1, wherein the multiple candidate actions have a planning horizon of L2, wherein a time of the new propagated belief is k+1, and wherein the steps of the system further comprise: sampling new measurements between times k+L1 and k+L2+l; responsively inferring additional posterior beliefs; calculating for the additional posterior beliefs respective additional immediate scores, and calculating the objective values by a weighted summation incorporating the additional immediate scores.

8. The system of claim 1, wherein the immediate score reflects a cost that is a function of the posterior belief and the candidate action, and wherein the optimal objective value is a minimum objective value of the candidate actions.

9. The system of claim 1, wherein the immediate score reflects a reward that is a function of the posterior belief and the candidate action, and wherein the optimal objective value is a maximum objective value of the candidate actions.

10. The system of claim 1, wherein the one or more measurement samples associated with each propagated belief space are one sampled measurement that is selected as the maximum likelihood measurement.

11. The system of claim 1, wherein determining the information gap comprises performing data association (DA) matching to determine measurements with DA to update, to add or to remove, and wherein updating the stored posterior belief comprises performing corresponding DA modifications to generate updated or added measurements and responsively to update one or more corresponding measurement values.

12. A method of decision making under uncertainty, for selecting an optimal action from among multiple candidate actions, the method implemented by a processor and an associated memory storing instructions, which when executed by the processor implement steps of the method comprising:
   A) from a current belief, inferring multiple new propagated beliefs according to the respective multiple candidate actions;
   B) accessing a stored set of propagated beliefs, wherein each given stored propagated belief is associated with one or more stored measurement samples and with one or more respective stored posterior beliefs inferred from the given stored propagated belief according to a respective measurement sample, wherein the stored propagated beliefs were propagated from prior beliefs during one or more precursory planning sessions at one or more respective previous times;
   C) for each new propagated belief generated for a respective candidate action: selecting from the set of stored propagated beliefs a closest stored propagated belief; selecting, from among the one or more stored measurement samples associated with the closest stored propagated belief, re-use measurement samples for a representative set of a measurement likelihood distribution corresponding to the new propagated belief;
   D) for each re-use measurement sample: determining an information gap between the stored posterior belief associated with the re-use measurement sample and a new posterior belief that would be inferred by applying the re-use measurement sample to the new propagated belief; responsively updating the stored posterior belief to account for the information gap and associating the new propagated belief with the updated posterior belief; calculating an immediate score for the updated posterior belief associated with the new propagated belief;
   E) subsequently, calculating objective values for the multiple candidate actions, wherein the calculation of the objective values is a weighted summation including the immediate scores of the updated posterior beliefs; and
   F) subsequently, determining the optimal action from among the multiple candidate actions according to the candidate action with the optimal objective value.

13. The method of claim 12, further comprising newly sampling one or more additional measurement samples for one or more of the new propagated beliefs, inferring from the one or more additional measurement samples respective one or more additional posterior beliefs, calculating additional immediate scores for the one or more additional posterior beliefs; and wherein the calculation of the objective values is a summation including the immediate scores of the updated posterior beliefs and of the additional posterior beliefs.

14. The method of claim 12, wherein selecting the re-use measurement samples for the representative set comprises determining which measurement samples are within a predetermined variance range of the measurement likelihood distribution.

15. The method of claim 12, wherein the candidate actions are sequences of actions over a planning horizon, which generate respective sequences of propagated beliefs branching from the new propagated belief, wherein the stored propagated beliefs include planning horizons including stored branches of stored propagated beliefs and associated measurements, and wherein the steps further include, upon determining that the information gap is less than a wildfire threshold, associating a stored branch of the closed stored propagated belief with the new propagated belief, with no updating of stored posterior beliefs of the stored branch.

16. The method of claim 12, wherein the immediate score reflects a cost that is a function of the posterior belief and the candidate action, and wherein the optimal objective value is a minimum objective value of the candidate actions.

17. The method of claim 12, wherein the immediate score reflects a reward that is a function of the posterior belief and the candidate action, and wherein the optimal objective value is a maximum objective value of the candidate actions.

18. The method of claim 12, wherein the one or more measurement samples associated with each propagated belief space are one sampled measurement that is selected as the maximum likelihood measurement.

19. The method of claim 12, wherein determining the information gap comprises performing data association (DA) matching to determine measurements with DA to update, to add or to remove, and wherein updating the posterior belief comprises performing corresponding DA modifications to generate updated or added measurements and responsively to update one or more corresponding measurement values.

* * * * *